US 9,499,146 B2

(12) United States Patent
Matsunaga et al.

(10) Patent No.: US 9,499,146 B2
(45) Date of Patent: Nov. 22, 2016

(54) HYDRAULIC BRAKING DEVICE

(71) Applicants: NISSIN KOGYO CO., LTD.,
 Ueda-Shi, Nagano (JP);
 (Continued)

(72) Inventors: Yoshiteru Matsunaga, Ueda (JP);
 Motoyasu Nakamura, Udea (JP);
 Kazuaki Murayama, Wako (JP)

(73) Assignees: Autoliv Nissin Brake Systems Japan Co., Ltd., Nagano (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/388,933

(22) PCT Filed: Mar. 29, 2013

(86) PCT No.: PCT/JP2013/059719
 § 371 (c)(1),
 (2) Date: Sep. 29, 2014

(87) PCT Pub. No.: WO2013/147249
 PCT Pub. Date: Oct. 3, 2013

(65) Prior Publication Data
 US 2015/0158473 A1    Jun. 11, 2015

(30) Foreign Application Priority Data

Mar. 30, 2012 (JP) ................................. 2012-083300

(51) Int. Cl.
 *B60T 8/36* (2006.01)
 *B60T 8/40* (2006.01)
 (Continued)

(52) U.S. Cl.
 CPC .............. *B60T 8/368* (2013.01); *B60T 8/4081*
 (2013.01); *B60T 13/686* (2013.01); *B60T 15/028* (2013.01); *B60T 17/04* (2013.01)

(58) Field of Classification Search
 CPC ............ B60T 8/17; B60T 8/34; B60T 15/028;
 B60T 8/368; B60T 8/4081; B60T 13/12
 (Continued)

(56) References Cited

U.S. PATENT DOCUMENTS 5,318,066 A * 6/1994 Burgdorf ................ B60T 8/365
 251/83
6,371,166 B1 * 4/2002 Yoshizawa ............ B60T 8/3675
 137/884

(Continued)

FOREIGN PATENT DOCUMENTS

DE   10059348 A1   6/2001
JP   H08-135830 A   5/1996
 (Continued)

OTHER PUBLICATIONS

Office Action of Nov. 5, 2015 to counterpart European Application No. EP 13 768 821.4.
(Continued)

*Primary Examiner* — Thomas J Williams
*Assistant Examiner* — Mariano Sy
(74) *Attorney, Agent, or Firm* — Carrier Blackman & Associates, P.C.; Joseph P. Carrier; Anne G. Sabourin

(57) ABSTRACT

Provided is a hydraulic braking device wherein the heat of a driving coil can be absorbed by a base body, and the heat radiation performance is excellent. The hydraulic braking device having a base body that includes therein a fluid passage for brake fluid, includes: a solenoid valve disposed on one surface of the base body; and a driving coil attached around an axis of the solenoid valve, wherein the one surface of the base body is provided with a wall surface facing an
(Continued)

outer circumferential surface of the driving coil. A lower surface of the driving coil is in contact with the one surface of the base body, and a clearance is formed between the outer circumferential surface of the driving coil and the wall surface.

8 Claims, 22 Drawing Sheets

(71) Applicants: HONDA MOTOR CO., LTD., Minato-Ku, Tokyo (JP)

(51) Int. Cl.
 B60T 15/02 (2006.01)
 B60T 13/68 (2006.01)
 B60T 17/04 (2006.01)

(58) Field of Classification Search
 USPC .............. 303/119.2, 119.3; 137/884, 596.17; 251/129.15
 See application file for complete search history.

(56) References Cited

U.S. PATENT DOCUMENTS

| | | | | |
|---|---|---|---|---|
| 6,486,761 | B1* | 11/2002 | Czarnetzki | B60T 8/363 251/129.15 |
| 2005/0001183 | A1* | 1/2005 | Hironaka | F16K 31/0665 251/50 |
| 2005/0006951 | A1* | 1/2005 | Schwarzer | B60T 8/36 303/119.2 |
| 2005/0012062 | A1* | 1/2005 | Hayashi | F16K 31/0665 251/129.15 |
| 2005/0178991 | A1* | 8/2005 | Goossens | B60T 8/363 251/129.07 |
| 2006/0163511 | A1* | 7/2006 | Trautmann | B60T 8/36 251/129.15 |
| 2009/0114865 | A1 | 5/2009 | Homann et al. | |
| 2010/0019180 | A1* | 1/2010 | Voss | B60T 8/363 251/129.15 |
| 2010/0314567 | A1* | 12/2010 | Uechi | B60T 8/36 251/129.15 |
| 2012/0298897 | A1* | 11/2012 | Nakamura | B60T 8/3675 251/129.15 |

FOREIGN PATENT DOCUMENTS

| | | |
|---|---|---|
| JP | 2001-039284 A | 2/2001 |
| JP | 2005-036928 A | 2/2005 |
| JP | 2007-099058 A | 4/2007 |

OTHER PUBLICATIONS

First Office Action issued on Dec. 31, 2015 to counterpart Chinese Patent Application No. 201380016568.6.

* cited by examiner

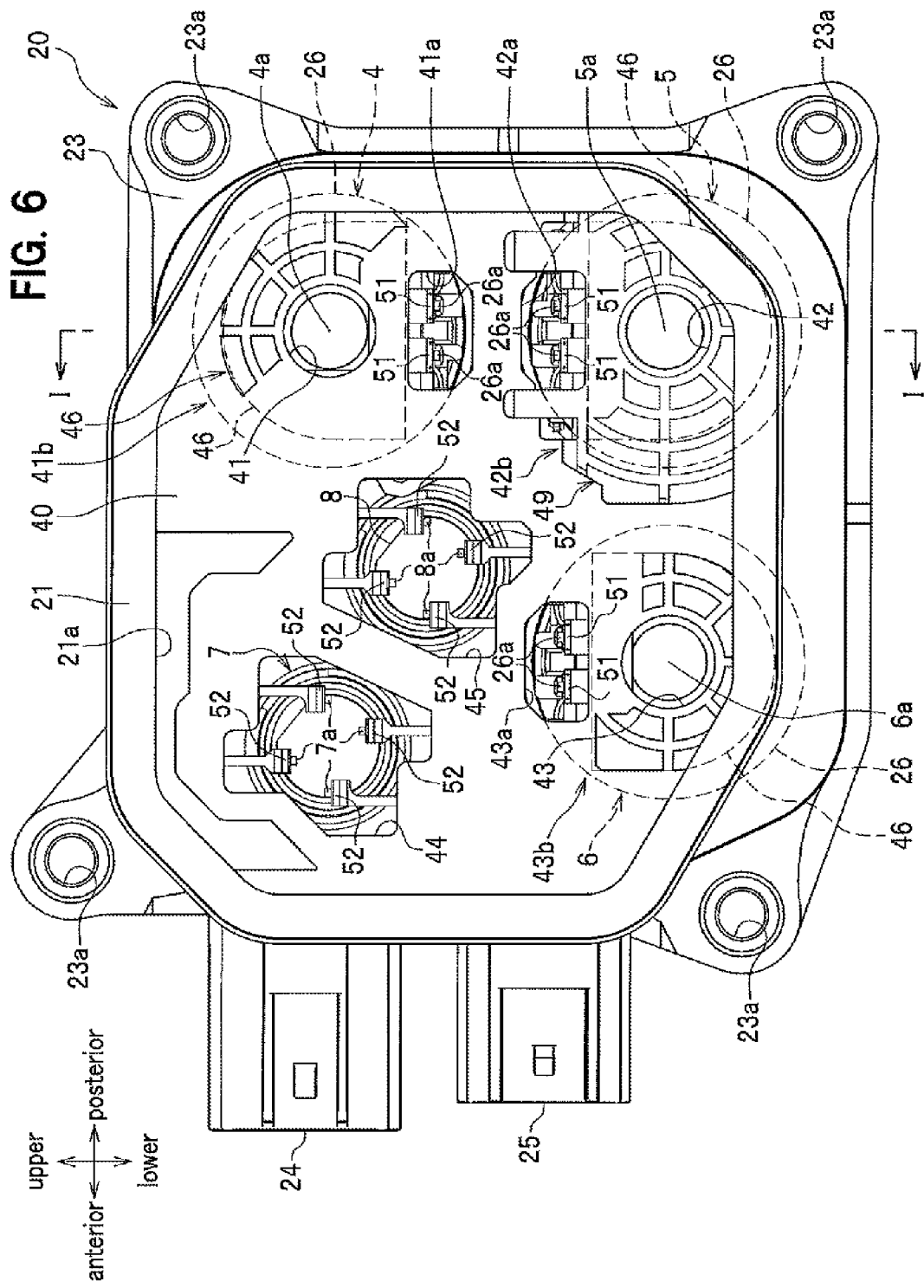

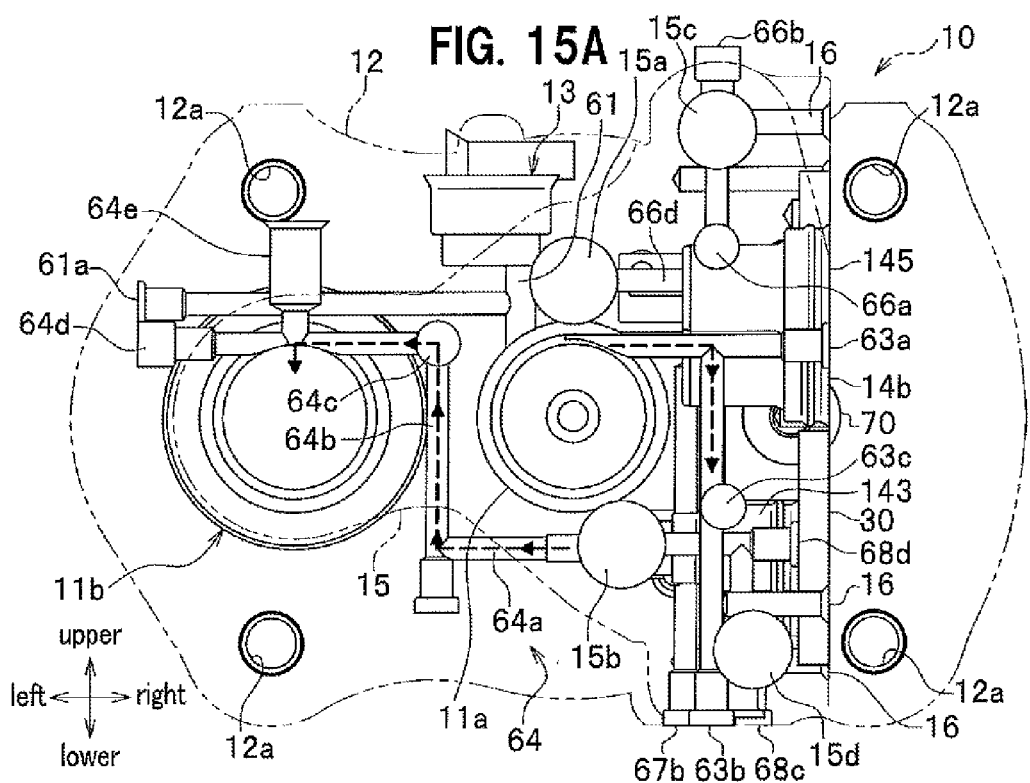
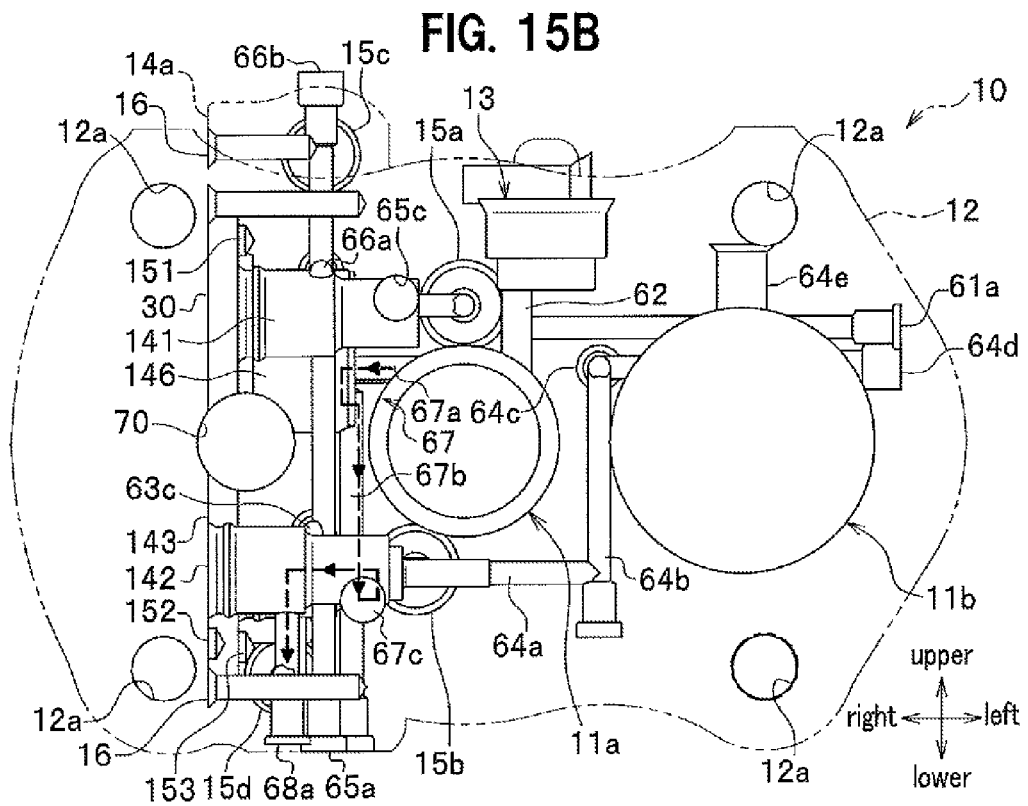

HYDRAULIC BRAKING DEVICE

TECHNICAL FIELD

The present invention relates to a hydraulic braking device including a base body that houses fluid passages of brake fluid.

BACKGROUND ART

Conventionally, as this kind of hydraulic braking device, known is a vehicle hydraulic braking device that controls hydraulic brake pressures applied to the wheel brakes of a vehicle (automobile) (for example, see Patent Literature 1).

This vehicle hydraulic braking device includes therein a base body provided with a master cylinder and fluid passages, wherein solenoid valves for opening and closing passages, a pressure sensor for detecting a hydraulic brake pressure, and other components are attached to the base body. The solenoid valves are driven by coils provided in a housing attached to the base body.

RELATED ART DOCUMENT

Patent Literature

Patent Literature 1: JP 2007-99058 A

DISCLOSURE OF THE INVENTION

Problems to be Solved by the Invention

When a current is applied to a driving coil for driving a solenoid valve, heat is generated by the electric resistance, and the temperature of the driving coil thus rises. If the temperature of a driving coil rises in such a manner, the temperature in a housing also rises, and there is a demand for inhibiting this situation.

The present invention has been developed in view of the above situation, and an object of the present invention is to provide a hydraulic braking device that is capable of absorbing the heat of a driving coil into a base body and is excellent in heat radiation performance.

Means for Solving the Problem

According to the present invention developed to solve such a problem, provided is a hydraulic braking device having a base body that includes therein a fluid passage for brake fluid, the hydraulic braking device including: a solenoid valve disposed on one surface of the base body; and a driving coil attached around an axis of the solenoid valve, wherein the one surface of the base body is provided with a wall surface facing an outer circumferential surface of the driving coil.

According to the hydraulic braking device of the present invention, it is possible to transfer the heat of the driving coil, whose temperature has risen to a high temperature, to the base body through the wall surface facing the outer circumferential surface. Thus, the heat of the driving coil can be absorbed by the base body, and can be radiated through the base body.

Further, according to the present invention, a lower surface of the driving coil is in contact with the one surface of the base body.

According to the hydraulic braking device of the present invention, the heat of the driving coil, whose temperature has risen to a high temperature, can be directly transferred to the base body through the lower surface of the driving coil. Thus, the heat of the driving coil can be further absorbed by the base body, and can be effectively radiated through the base body.

Still further, according to the present invention, the hydraulic braking device includes a housing for housing the driving coil, wherein an urging means for urging the driving coil toward the one surface of the base body is provided between the housing and the driving coil.

According to the hydraulic braking device of the present invention, the lower surface of the driving coil is ensured to contact with the base body by the urging means, and the heat is ensured to be transferred to the base body through the lower surface of the driving coil. Thus, heat can be effectively radiated through the base body.

Yet further, according to the present invention, a clearance is formed between the outer circumferential surface of the driving coil and the wall surface.

According to the hydraulic braking device of the present invention, even when a little deviation of the attaching position of the driving coil housed in the housing exists, it can be appropriately absorbed by clearance, and excellent assembility can be achieved.

Still further, according to the present invention, a recessed portion is provided on the one surface of the base body, the recessed portion being arranged around an attaching hole to which the solenoid valve is attached, and a circumferential wall forming the recessed portion forms the wall surface, the circumferential wall facing the outer circumferential surface of the driving coil.

According to the hydraulic braking device of the present invention, the wall surface facing the outer circumferential surface of the driving coil can be easily provided by forming a recessed portion, and the productivity is thereby excellent.

SUMMARY OF THE INVENTION

According to the present invention, a hydraulic braking device can be obtained wherein the heat of a driving coil can be absorbed by a base body, and the heat radiation performance is excellent.

BRIEF DESCRIPTION OF THE DRAWINGS

FIGS. 4A and 4B show the base body of the master cylinder device, wherein FIG. 4A is a right side view, and FIG. 4B is a posterior view;

FIGS. 5A and 5B show the base body of the master cylinder device, wherein FIG. 5A is a top view, and FIG. 5B is a bottom view;

FIG. 6 is a right side view showing a housing to which components such as a normally-open shutoff valve are attached;

FIG. 15A is a transparent view of the flow passage section of the master cylinder device in an anterior view, and FIG. 15B is a transparent view of the same in a posterior view;

EMBODIMENT FOR CARRYING OUT THE INVENTION

Figure 1:
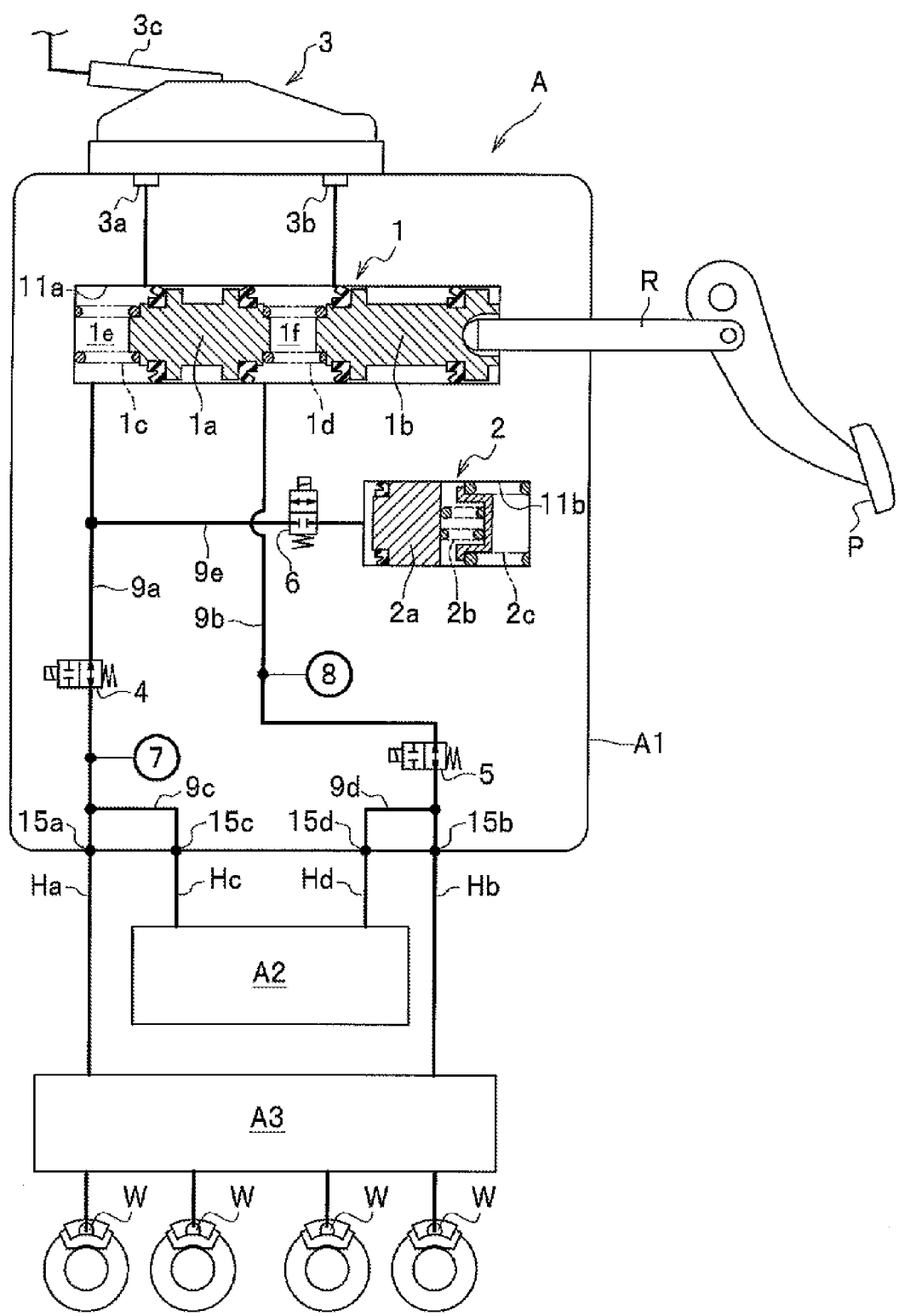
FIG. 1 is a schematic diagram of a vehicle braking system provided with a master cylinder device according to an embodiment of the present invention.

A vehicle braking system A provided with a master cylinder device A1 (hydraulic braking device) shown in FIG. 1 includes both a by-wire braking system that operates at a start of a power device (an engine, a motor, or the like) and a hydraulic braking system that operates in an emergency, at a time when the power device stops, or at other time. The vehicle braking system A includes a motor cylinder device A2 that generates a hydraulic brake pressure using an electric motor (not shown) and a vehicle stability assist device A3 (hereinafter, referred to as 'a hydraulic control device A3') for assisting the stability of vehicle behavior. The master cylinder device A1 generates a hydraulic brake pressure by brake pedal effort on a brake pedal (brake operator) P. The master cylinder device A1, the motor cylinder device A2, and the hydraulic control device A3 are structured as different units and communicate with each other through external pipes.

The vehicle braking system A can be mounted on a vehicle only with an engine (internal combustion engine) as a power device, and also on a hybrid vehicle also using a motor, an electric vehicle only with a motor as a power device, a fuel cell electric vehicle, or the like.

The master cylinder device A1 includes a tandem master cylinder 1, a stroke simulator 2, a reservoir 3, normally-open shutoff valves (solenoid valves) 4, 5, normally-closed shutoff valve (solenoid valve) 6, pressure sensors 7, 8, main hydraulic passages (fluid passages) 9a, 9b, communicating hydraulic passages (fluid passages) 9c, 9d, and a branch hydraulic passage 9e.

The master cylinder 1 converts a brake pedal effort on the brake pedal P into a hydraulic brake pressure, and includes a first piston 1a disposed on the bottom wall side of a first cylinder hole 11a, a second piston 1b connected to a push rod R, a first return spring 1c disposed between the first piston 1a and the bottom wall of the first cylinder hole 11a, and a second return spring 1d disposed between the pistons 1a, 1b. The second piston 1b is connected to the brake pedal P through the push rod R. The first pistons 1a, 1b slide, receiving the pedal effort on the brake pedal P, and apply pressure to the brake fluid in pressure chambers 1e, 1f. The pressure chambers 1e, 1f communicate with the main hydraulic passages 9a, 9b. The brake pressures of the pressure chambers 1e, 1f are the same.

The stroke simulator 2 generates a pseudo operational reaction force, and includes a piston 2a sliding in the second cylinder hole 11b, and larger and smaller return springs 2b, 2c urging the piston 2a. The stroke simulator 2 communicates with the pressure chamber 1e through the main hydraulic passage 9a and the branch hydraulic passage 9e to operate by a hydraulic brake pressure generated by the pressure chamber 1e.

The reservoir 3 is a container for reserving brake fluid and includes oil supply ports 3a, 3b connected to the master cylinder 1, and a pipe connecting port 3c to which a hose extending from a main reservoir (not shown) is connected.

The normally-open shutoff valves 4, 5 open and close the main hydraulic passages 9a, 9b, and both are solenoid valves of a normal-open type. The normally-open shutoff valve 4 opens and closes the main hydraulic passage 9a in the section from the intersection between the main hydraulic passage 9a and the branch hydraulic passage 9e to the intersection between the main hydraulic passage 9a and the communicating hydraulic passage 9c. The normally-open shutoff valve 5 opens and closes the main hydraulic passage 9b on the upstream side of the intersection between the main hydraulic passage 9b and the communicating hydraulic passage 9d.

The normally-closed shutoff valve 6 opens and closes the branch hydraulic passage 9e and is a solenoid valve of a normal closed type.

Figure 3:
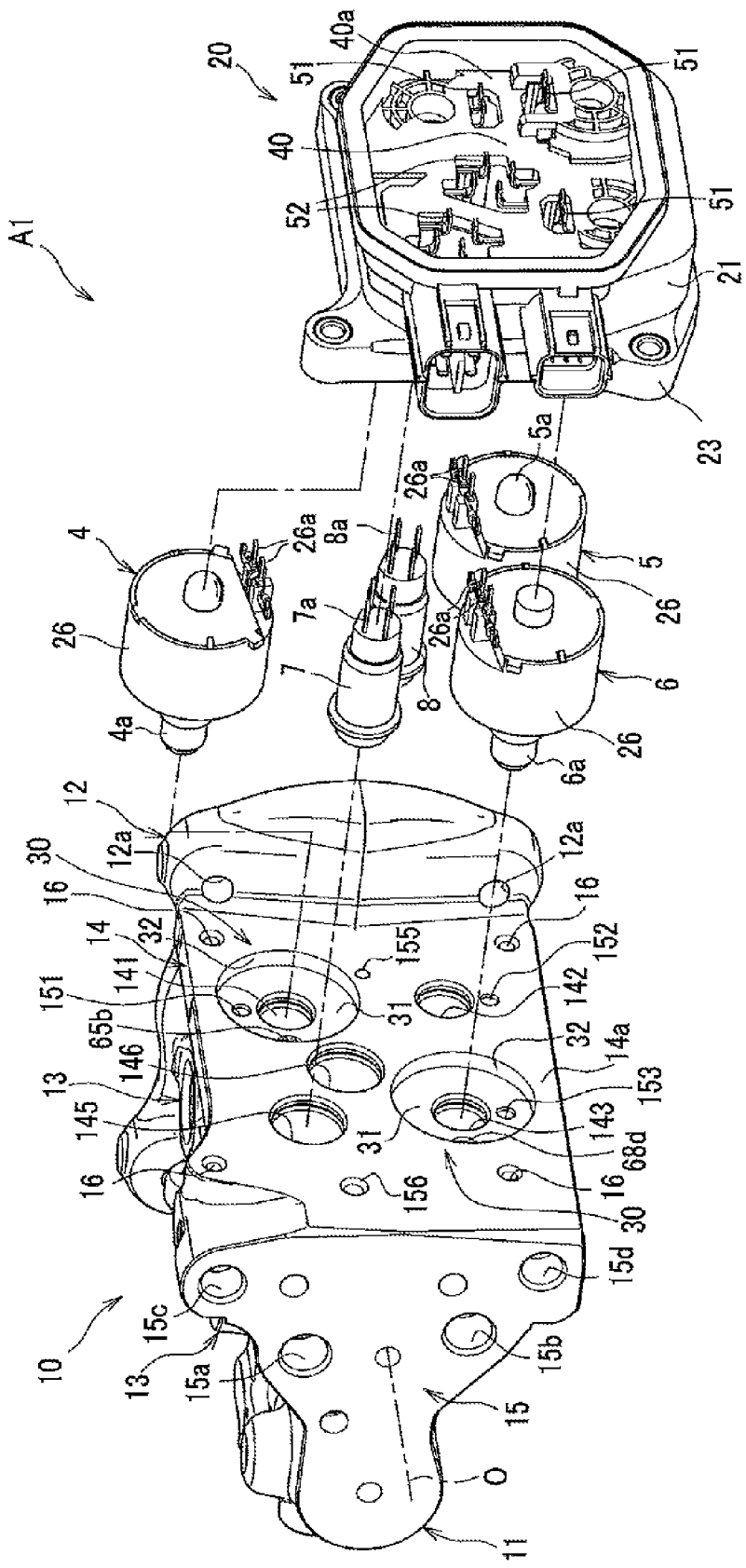
FIG. 3 is an exploded perspective view of the master cylinder device.

As shown in FIG. 3, the normally-open shutoff valve 4 is configured by a solenoid valve 4a and a coil 26 (driving coil) for driving the solenoid valve 4a, and the normally-open shutoff valve 5 is configured by a solenoid valve 5a and a coil 26 for driving the solenoid valve 5a. The normally-closed shutoff valve 6 is configured by a solenoid valve 6a and a coil 26. In the present embodiment, coils 26 common to the respective valves are used.

Figure 9:
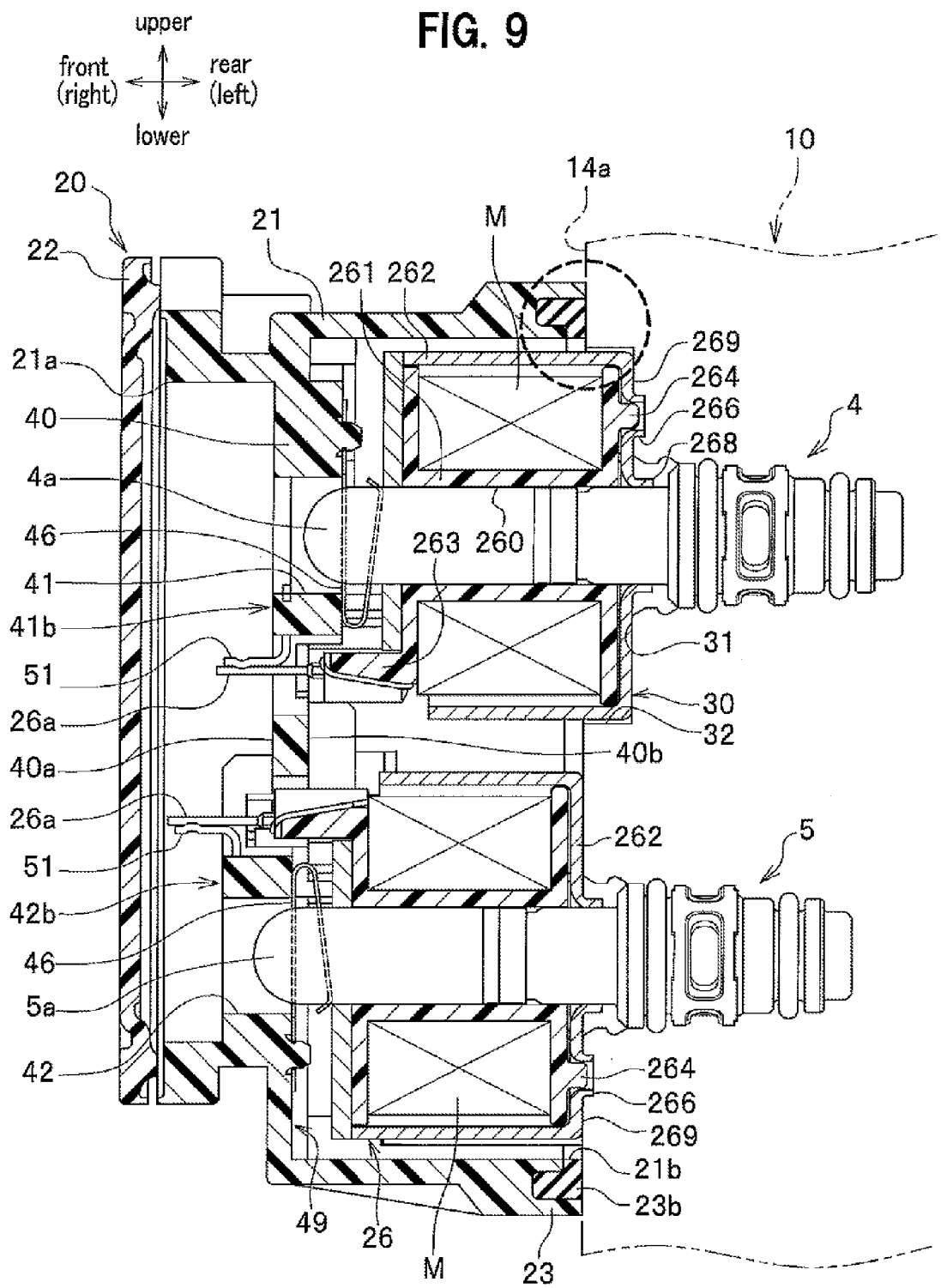
FIG. 9 is a cross-sectional view taken along line I-I in FIG. 6.

The coils 26 are substantially in a cylindrical shape, and as shown in FIG. 9, have center holes 260 into which the solenoid valves 4a, 5a, and 6a (only solenoid valves 4a and 5a shown) are inserted. The each coil 26 includes a bobbin 261 of a resin around which a coil M is wound, and a yoke 262 surrounding the bobbin 261 and forming a magnetic path.

The bobbin 261 includes a terminal holding portion 263 and a positioning protrusion 264. The terminal holding portion 263 is provided with a connecting terminal 26a. The positioning protrusion 264 protrudes from the bottom portion of the bobbin 261 toward the side (the base body 10 side) opposite to a housing 20. The yoke 262 is provided with a cylindrical engaging portion 266 with which the positioning protrusion 264 engages. The lower end portion of the yoke 262 is provided with a skirt portion 268 along the solenoid valve 4a, 5a, or 6a (only solenoid valves 4a and 5a shown).

The pressure sensors 7, 8 detect the magnitudes of hydraulic brake pressure, and are as shown in FIG. 1 attached to sensor openings 44, 45 (see FIG. 6) communicating with the main hydraulic passages 9a, 9b. The pressure sensor 7 is disposed on the downstream side of the normally-open shutoff valve 4, and detects a hydraulic brake pressure generated by the motor cylinder device A2 when the normally-open shutoff valve 4 is closed (i.e. in a state that the main hydraulic passage 9a is shut off). The pressure sensor 8 is disposed on the upstream side of the normally-open shutoff valve 5, and detects a hydraulic brake pressure generated by the master cylinder 1 when the normally-open shutoff valve 5 is closed (i.e. in a state that the main hydraulic passage 9b is shut off). Information obtained by the pressure sensors 7, 8 is output to an electric control unit (ECU) not shown.

The pressure sensors 7, 8 are provided with terminals 7a, 8a as shown in FIG. 3.

As shown in FIG. 1, the main hydraulic passages 9a, 9b are hydraulic pressure passages originating at the master cylinder 1. Output ports 15a, 15b, which are the end points of the main hydraulic passages 9a, 9b are connected with pipe members Ha, Hb reaching the hydraulic control device A3.

The communicating hydraulic passages 9c, 9d are hydraulic pressure passages extending from input ports 15c, 15d to the main hydraulic passages 9a, 9b. The input ports 15c, 15d are connected with pipe members Hc, Hd extending to the motor cylinder device A2. That is, a hydraulic brake pressure generated by the motor cylinder device A2 is output to the hydraulic control device A3 through the master cylinder device A1.

The branch hydraulic passage 9e branches from the main hydraulic passage 9a and extends to the stroke simulator 2.

The master cylinder device A1 communicates with the hydraulic control device A3 through the pipe members Ha, Hb. When the normally-open shutoff valves 4, 5 are in an open state, a hydraulic brake pressure generated by the master cylinder 1 is input to the hydraulic control device A3 through the main hydraulic passages 9a, 9b and the pipe members Ha, Hb.

Though not shown, the motor cylinder device A2 is provided with a slave piston sliding in a slave cylinder, an actuator mechanism having an electric motor and a driving force transmitting section, and a reservoir for reserving brake fluid in the slave cylinder.

The electric motor operates, based on a signal from an electric control unit not shown. The driving force transmitting section converts the rotation power of the electric motor to forward and backward motion and transmits the motion to the slave piston. The slave piston slides in the slave cylinder by the driving force of the electric motor, and applies pressure to the brake fluid in the slave cylinder.

A hydraulic brake pressure generated by the motor cylinder device A2 is, as described above, input to the master cylinder device A1 through the pipe members Hc, Hd, and input to the hydraulic control device A3 through the communicating hydraulic passages 9c, 9d and the pipe members Ha, Hb. A hose extending from a main reservoir (not shown) is connected to the reservoir.

The hydraulic control device A3 is configured such as to be able to execute antilock brake control (ABS control) for reducing slippage of wheels, skid control and traction control for stabilizing the behavior of the vehicle, and the like, and is connected to wheel cylinders W, W, through pipe members. Incidentally, though not shown, the hydraulic control device A3 includes a hydraulic pressure unit provided with solenoid valves, a pump, etc., a motor for driving the pump, an electronic control unit for controlling the solenoid valves, the motor, etc., and the like.

The operation of the vehicle braking system A will be briefly described below.

In a normal state in which the vehicle braking system A normally functions, the normally-open shutoff valves 4, 5 are in a valve closed state, and the normally-closed shutoff valve 6 is in a valve open state. In this state, when the brake pedal P is operated, a hydraulic brake pressure generated by the master cylinder 1 is not transmitted to the wheel cylinders W but is transmitted to the stroke simulator 2 so that the piston 2a is displaced, the stroke of the brake pedal P is thereby permitted, and a pseudo operational reaction force is applied to the brake pedal P.

Further, when a brake pedal effort on the brake pedal P is detected by a stroke sensor, not shown, or the like, the electric motor of the motor cylinder device A2 is driven so that the slave piston is displaced and a pressure is thereby applied to the brake fluid in the cylinder.

The electronic control unit, not shown, compares the hydraulic brake pressure (hydraulic brake pressure detected by the pressure sensor 7) output from the motor cylinder device A2 and the hydraulic brake pressure (the hydraulic brake pressure detected by the pressure sensor 8) output from the master cylinder 1, and controls the number of revolutions of the electric motor and the like, based on a result of the comparison.

The hydraulic brake pressure generated by the motor cylinder device A2 is transmitted through the hydraulic control device A3 to the wheel cylinders W, W, and the respective wheel cylinders W operate, thereby applying a braking force to the respective wheels.

Incidentally, in a state that the motor cylinder device A2 does not operate (for example, in a case of unavailability of electric power, emergency, or the like), both the normally-open shutoff valves 4 and 5 become into a valve open state and the normally-closed shutoff valve 6 becomes into a valve closed state, and accordingly, a hydraulic brake pressure generated by the master cylinder 1 is transmitted to the wheel cylinders W, W.

A concrete structure of the master cylinder device A1 will be described below.

Figure 2A:
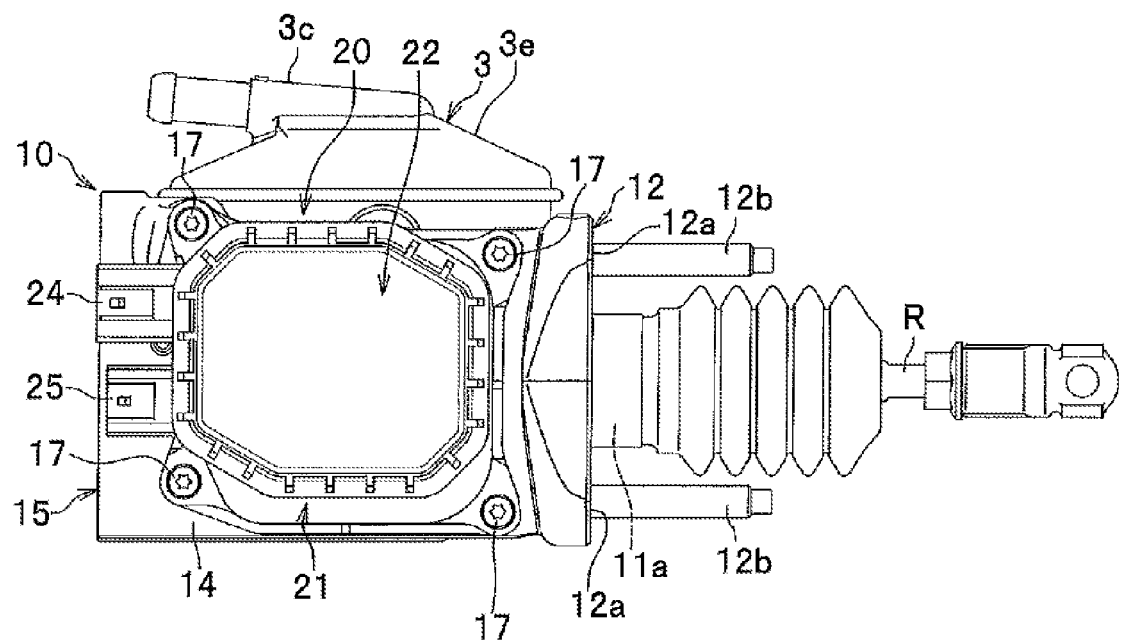
FIG. 2A is a right side view of the master cylinder device (hydraulic braking device)
Figure 2B:
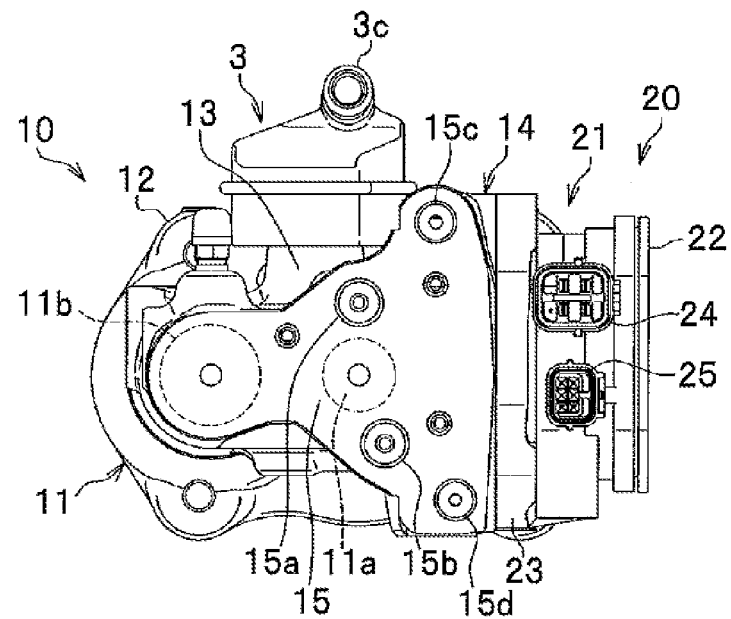
FIG. 2B is an anterior view of the same.

The master cylinder device A1 in the present embodiment is structured by attaching the above-described various components to the inside or outside of the base body 10 in FIGS. 2A and 2B, and covering by the housing 20 electric components (the normally-open shutoff valves 4, 5, the normally-closed shutoff valve 6, and the pressure sensors 7, 8 (see FIG. 1)), which are electrically operated. Incidentally, mechanical components and the like may be housed in the housing 20.

The base body 10 is a cast product of an aluminum alloy, and is provided with a cylinder section 11 (see FIG. 2B, the same hereinafter), a vehicle body fixing section 12, a reservoir fitting section 13 (see FIG. 2B, the same hereinafter), a housing fitting section 14, and a pipe connecting section 15. Further, holes to be the main hydraulic passages 9a, 9b and the branch hydraulic passage 9e, and the like are formed inside the base body 10. The hydraulic passaged (fluid passages) will be described later in detail.

The cylinder section 11 is provided with the first cylinder hole 11a for the master cylinder and the second cylinder hole 11b for the stroke simulator (both shown by dashed lines in FIG. 2B). The cylinder holes 11a, 11b are both in a bottomed cylindrical shape, open at the vehicle body fixing section 12, and extending toward the pipe connecting section 15. In the first cylinder hole 11a, inserted are the components (the first piston 1a, the second piston 1b, the first return spring 1c, and the second return spring 1d) constructing the master cylinder 1 (see FIG. 1), and in the second cylinder hole 11b, inserted are the components (the piston 2a, and the return springs 2b, 2c) constructing the stroke simulator 2.

The vehicle body fixing section 12 is fixed to a fixing part on the vehicle side, such as a toe board, not shown. The vehicle body fixing section 12 is formed in a flange shape at the posterior face portion of the base body 10. The marginal portion (the portion expanding from the cylinder section 11) of the vehicle body fixing section 12 is provided with a bolt insertion hole 12a (see FIG. 3). A fixing bolt 12b (see FIG. 2A) is fixed to the bolt insertion hole 12a.

Figure 5A:
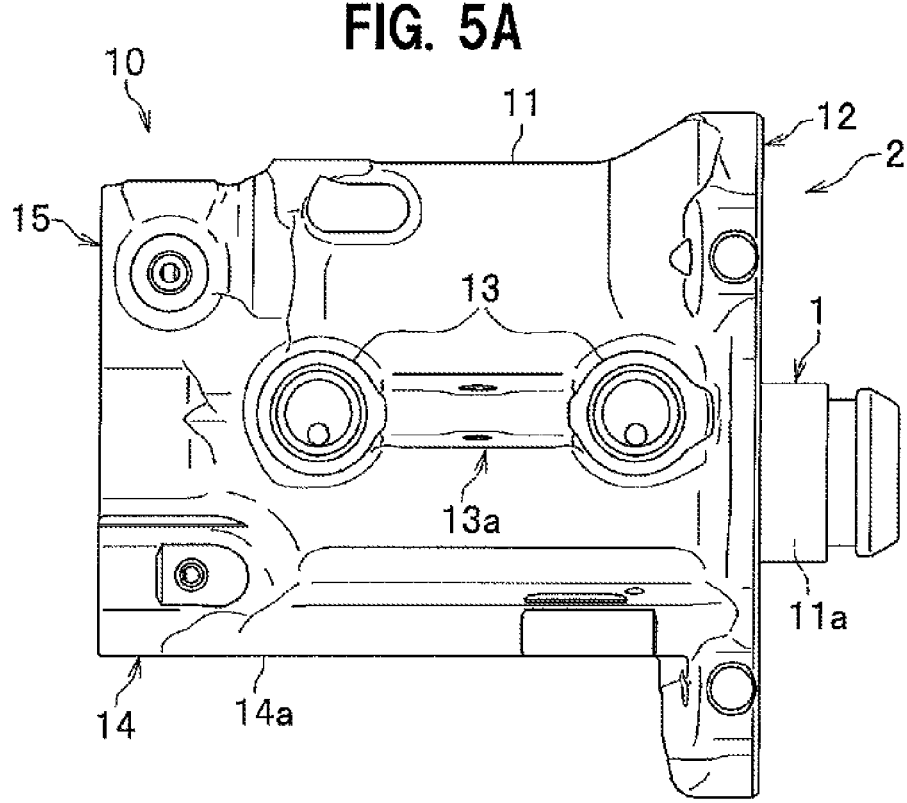

As shown in FIG. 2B and FIG. 5A, the reservoir fitting section 13 is a part serving as the fitting seat of the reservoir 3. The reservoir fitting section 13 is formed in two pieces (only one piece is shown in FIG. 2B) at the upper face portion of the base body 10. The reservoir fitting section 13 is provided with a reservoir union port. Incidentally, the reservoir 3 is fixed to the base body 10 through a connecting portion 13a (see FIG. 5A) protruding on the upper face of the base body 10.

The reservoir union port is in a cylindrical shape and communicates with the first cylinder hole 11a through a hole extending from the bottom surface thereof toward the first cylinder hole 11a. The reservoir union port is connected with a fluid supply port, not shown, protruding from the lower portion of the reservoir 3. The main body of the container of the reservoir 3 is mounted on the upper end of the reservoir union port.

The pipe connecting section 15 is a part serving as a pipe fitting seat, and as shown in FIG. 2A, formed at the anterior face portion of the base body 10. As shown in FIG. 2B, the pipe connecting section 15 is provided with the two output ports 15a, 15b, and the two input ports 15c, 15d. The pipe members Ha, Hb (see FIG. 1) reaching the hydraulic control device A3 are connected to the output ports 15a, 15b, and the pipe members Hc, Hd (see FIG. 1) reaching the motor cylinder device A2 are connected to the input ports 15c, 15d.

The housing fitting section 14 is a part serving as a fitting seat of the housing 20, and as shown in FIG. 3, in a flange shape. The housing fitting section 14 has an attaching surface 14a (a surface substantially perpendicular to the axial line (the central axis O of the master cylinder 1) of the base body 10) to which the housing 20 is attached.

Figure 4A:
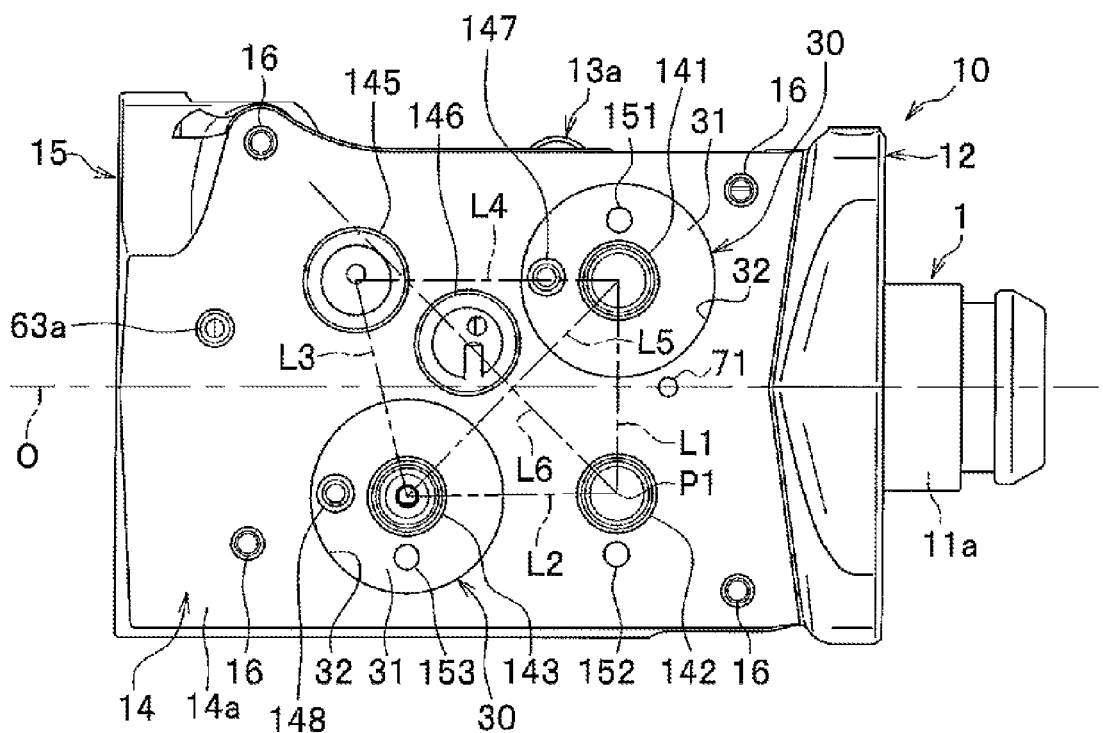
Figure 5B:
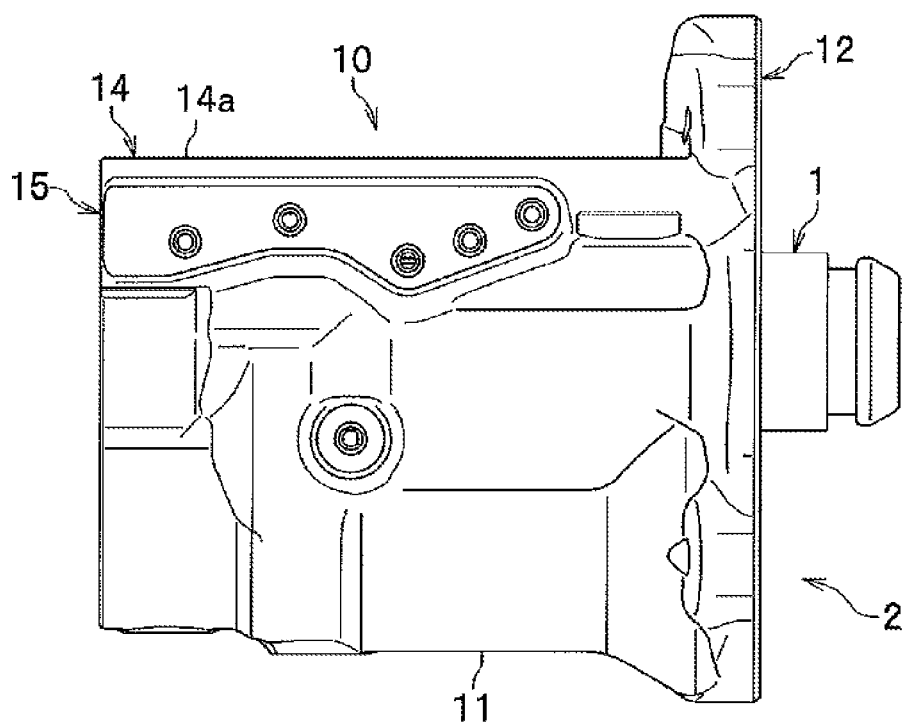

As shown in FIG. 4A, the attaching surface 14a is a flat surface formed substantially in a rectangular shape in a side view (see FIGS. 5A and 5B), wherein the four corner edge portions thereof are provided with four fitting hole portions 16 for fitting the housing 20.

Further, the attaching surface 14a is provided with three valve attaching holes 141, 142, 143, two sensor attaching holes 145, 146, two fluid passage holes (horizontal holes) 147, 148, and three rotation preventing recessed portions 151, 152, 153.

The normally-open shutoff valve 4 for the master cylinder 1 is attached to the first valve attaching hole 141, and the second normally-open shutoff valve 5 for the master cylinder 1 is attached to the second valve attaching hole 142. Further, the normally-closed shutoff valve 6 for the stroke simulator 2 is attached to the third valve attaching hole 143.

Recessed portions 30, 30 in a counterbore shape recessed from the attaching surface 14a toward the inner portion side of the base body 10 are provided around the valve attaching holes 141, 143 out of the three valve attaching holes 141-143, wherein the valve attaching holes 141, 143 are formed being recessed by a step compared with the valve attaching hole 142 toward the inner side of the base body 10. That is, the valve attaching hole 142 is open at the flat surface, which is the most part of the attaching surface 14a, while the valve attaching holes 141, 143 are open at respective bottom surfaces 31 of the recessed portions 30, the bottom surfaces 31 being lower by one step than the flat surface.

Figure 10A:
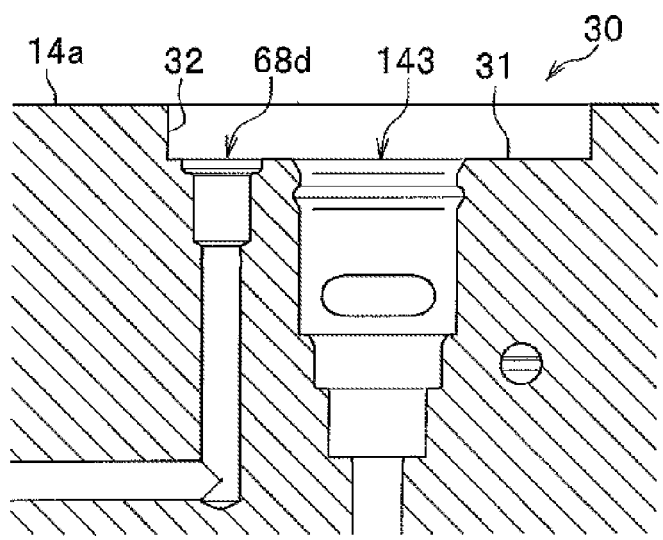
FIG. 10A is an enlarged cross-sectional view showing a recessed portion.

The each recessed portion 30 has the bottom surface 31 and an inner circumferential surface (a circumferential wall or a wall surface) 32 (see FIG. 10A). As shown in FIG. 9, the lower surface 269 of the yoke 262 of the coil 26 is in contact with the bottom surface 31, and the lower outer circumferential surface 267 (see FIG. 10B) of the yoke 262 is disposed facing the inner circumferential surface 32. That is, the coil 26 is in contact with one surface (attaching surface 14a) of the base body 10 inside the recessed portion 30.

The relationship between a recessed portion 30 and a coil 26 will be described later in detail.

The pressure sensors 7, 8 are fitted to the two sensor attaching holes 145, 146. Two fluid passage holes 147, 148 are open at the bottom surfaces 31 of the respective recessed portions 30, wherein a spherical body for closing the opening is pressure fitted to the fluid passage holes 147, 148.

The three rotation preventing recessed portions 151-153 are arranged adjacent to the circumferences of the three valve attaching holes 141-143. The three rotation preventing recessed portions 151-153 are arranged corresponding to the positioning protrusions 264 (see FIG. 9) of the coils 26, wherein the positioning protrusions 264 are engaged with these to function as rotation preventing recessed portions for the coils 26.

The rotation preventing recessed portions 151, 153 are formed such as to be open at the bottom surfaces 31, 31 of the recessed portions 30, 30. At the bottom surfaces 31, 31, the rotation preventing recessed portions 151, 153 are disposed with a space along the circumferential direction from the above-described fluid passage holes 147, 148. In the present embodiment, the rotation preventing recessed portions 151, 153 are disposed with a space by 90 degrees along the circumferential direction at the bottom surfaces 31, 31.

The valve attaching holes 141-143 and the sensor attaching holes 145, 146 communicate with the main hydraulic passages 9a, 9b (see FIG. 1, the same hereinafter) in which brake fluid flows. Incidentally, in FIG. 3, the spherical bodies pressure fitted to the fluid passage holes 147, 148 are not shown.

Figure 4B:
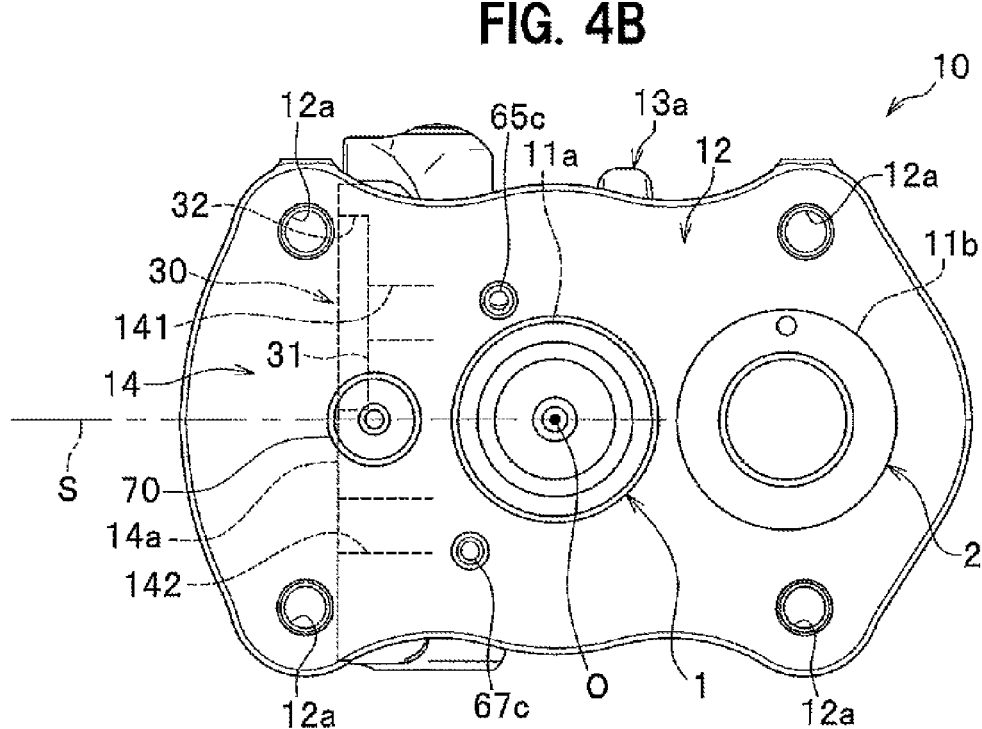

Herein, the valve attaching holes 141, 142 are formed one above the other, with the central axis O of the master cylinder 1 therebetween, in a view from the right side in the direction perpendicular to the attaching surface 14a (see FIG. 4A). That is, as shown in FIG. 4B, the valve attaching holes 141, 142 are disposed one above the other, with the reference surface S including the central axis O and being perpendicular to the attaching surface 14a as the boundary. Thus, the normally-open shutoff valves 4, 5 for the master cylinder 1 for opening and closing the main hydraulic passages 9a, 9b are disposed one above the other, with the central axis O of the master cylinder 1 therebetween.

Further, the two attaching holes, namely, the sensor attaching hole 145 and the valve attaching hole 143 are formed one above the other likewise, with the central axis O (reference surface S) of the master cylinder 1 therebetween. That is, the pressure sensor 7 for detecting the pressure of the main hydraulic passage 9a and the normally-closed shutoff valve 6 for opening and closing the branch hydraulic passage 9e (see FIG. 1) are disposed one above the other, with the central axis O of the master cylinder 1 therebetween.

Further, the three valve attaching holes 141-143 and the sensor attaching hole 145 are disposed such as to form the corners of a quadrilateral. That is, as shown in FIG. 4A, disposition is arranged on the attaching surface 14a such that a quadrilateral (trapezoid) is formed by lines L1, L2, L3, and L4 connecting the central positions of the three valve attaching holes 141-143 and the central position of the sensor attaching hole 145, and a quadrilateral (trapezoid) is formed by the three solenoid valves 4a-6a and the pressure sensor 7.

Further, Lines L1, L2, L5 connecting the central positions of the three valve attaching holes 141-143 are disposed such as to form an isosceles triangle. Further, the one sensor attaching hole 146 out of the two sensor attaching holes 145, 146 is disposed on a isosceles line L6 extending from an apex P1 of this isosceles triangle.

The one sensor attaching hole 146 is disposed in a region on the outer side of the above-described isosceles triangle. The one sensor attaching hole 146 is disposed in a region on the outer side of the above-described isosceles triangle and on the inner side of the above-described quadrilateral. Further, the one sensor attaching hole 146 is disposed between the recessed portions 30, 30.

The one sensor attaching hole 146 is disposed on a line, not shown, connecting the central positions of the fluid passage holes 147, 148 of the recessed portions 30, 30.

The housing 20 is in a box shape of a synthetic resin and includes, as shown in FIG. 9, a circumferential wall portion 21 open on the front side and rear side, a cover 22 closing the opening 21a on the front side of the circumferential wall portion 21, a flange portion 23 protruding from the outer circumferential marginal portion of the opening 21b on the rear side of the circumferential wall portion 21, two connectors 24, 25 (see FIG. 6) protruding from the circumferential wall portion 21, an in-between wall portion 40 arranged inside the circumferential wall portion 21, and a coil busbar 51 and a sensor busbar 52 (see FIG. 3, hereinafter referred to as busbars 51, 52) buried in the in-between wall portion 40.

The circumferential wall portion 21 is a part that liquid-tightly covers components (the normally-open shutoff valves 4, 5, the normally-closed shutoff valve 6, and the pressure sensors 7, 8, see FIG. 1, the same hereinafter) fitted to the housing 20, and the outer circumference thereof is formed substantially in a quadrilateral shape (see FIG. 8A).

The cover 22 is, as shown in FIGS. 2A and 2B, a lid body for tightly closing the opening 21a on the front side of the circumferential wall portion 21, and is fixed to the end surface on the front side of the circumferential wall portion 21 by means of welding, adhering, or the like.

The flange portion 23 is a part press-attached to the housing fitting section 14. At the four corners of the flange portion 23, formed are screw holes 23a, meeting with the fitting hole portions 16 (see FIG. 3) of the housing fitting section 14. Screws 17 (see FIG. 2A) inserted through these screw holes 23a are screw-engaged with the fitting hole portions 16 of the housing fitting section 14, and the housing 20 is thereby fixed to the housing fitting section 14.

Further, as shown in FIG. 9, an endlessly shaped seal member 23b tightly attaching to the housing fitting section 14 (the attaching surface 14a) is attached to the end surface on the rear side of the flange portion 23.

Figure 7:
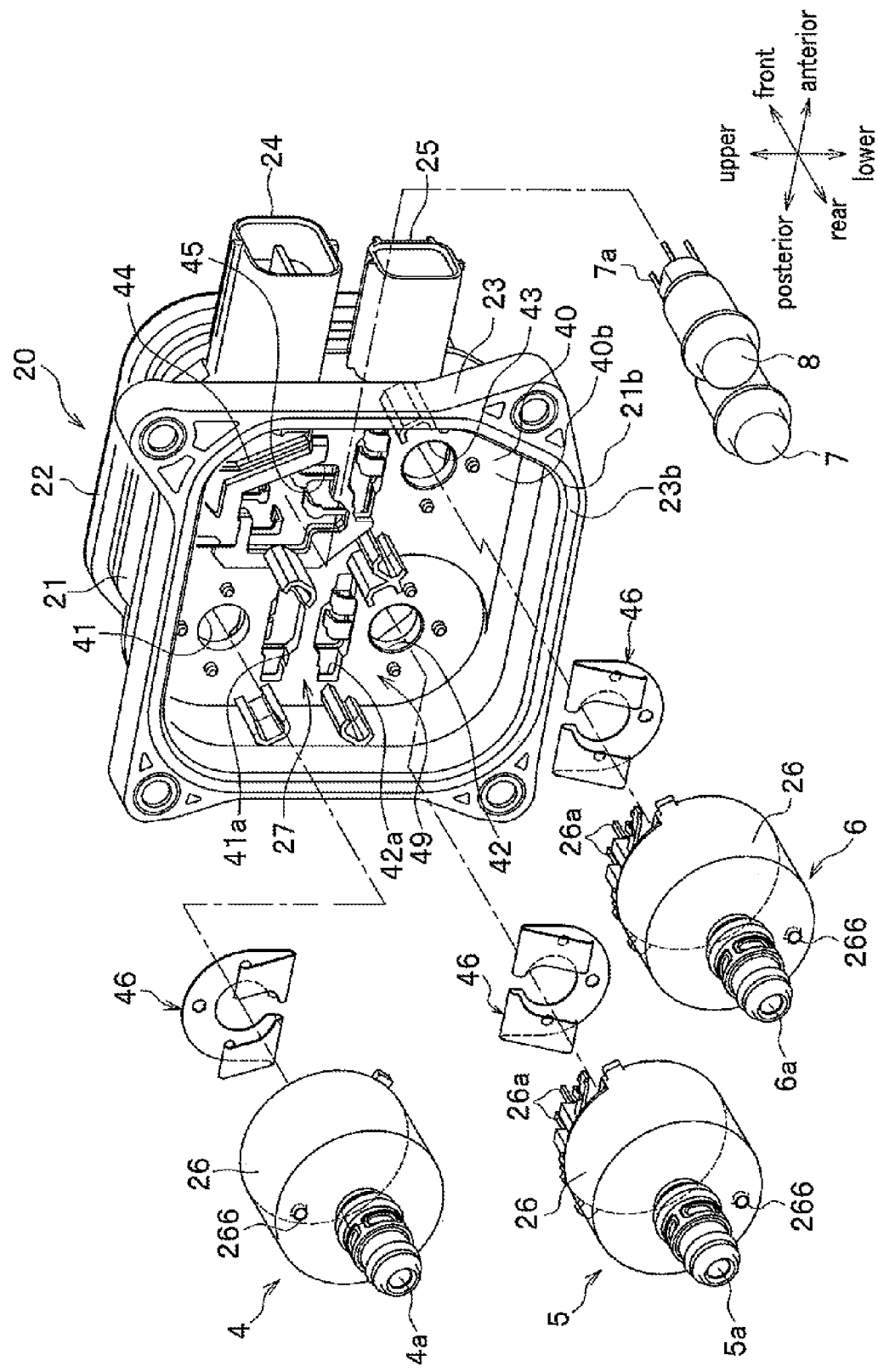
FIG. 7 is an exploded perspective view of the housing viewed from the rear surface side (left surface side)

As shown in FIG. 7, the connectors 24, 25 are in an edged hollow tube shape and are protruding from the anterior surface of the circumferential wall portion 21, with a gap along the vertical direct ion. The upper connector 24 is connected with a cable, not shown, for supplying power to the respective coils 26. The lower connector 25 is connected with a cable for transmitting detection signals outputted from the pressure sensors 7, 8 to an electronic control unit not shown.

The in-between wall portion 40 is, as shown in FIG. 9, a partitioning wall for partitioning the space inside the circumferential wall portion 21 into a front side and a rear side. The in-between wall portion 40 is, as shown in FIG. 6, formed substantially in a quadrilateral shape, wherein the corner portion 42b on the posterior lower side of the in-between wall portion 40 is offset (protruding) to the front side compared with other parts. Thus, a recessed portion 49 (see FIG. 7) is formed on the rear face side of the in-between wall portion 40 by the offset, as shown in FIG. 8B. The recessed portion 49 has a size large enough to house a coil 26. Thus, as describe later, it is possible to offset the attachment position of the solenoid valve 5a of the normally-open shutoff valve 5 at the corner portion 42b to the front side of the in-between wall portion 40.

On the rear side of the in-between wall portion 40, as shown in FIG. 7, a housing room 27 is provided to house the normally-open shutoff valves 4, 5, the normally-closed shutoff valve 6, and the pressure sensors 7, 8.

Figure 8A:
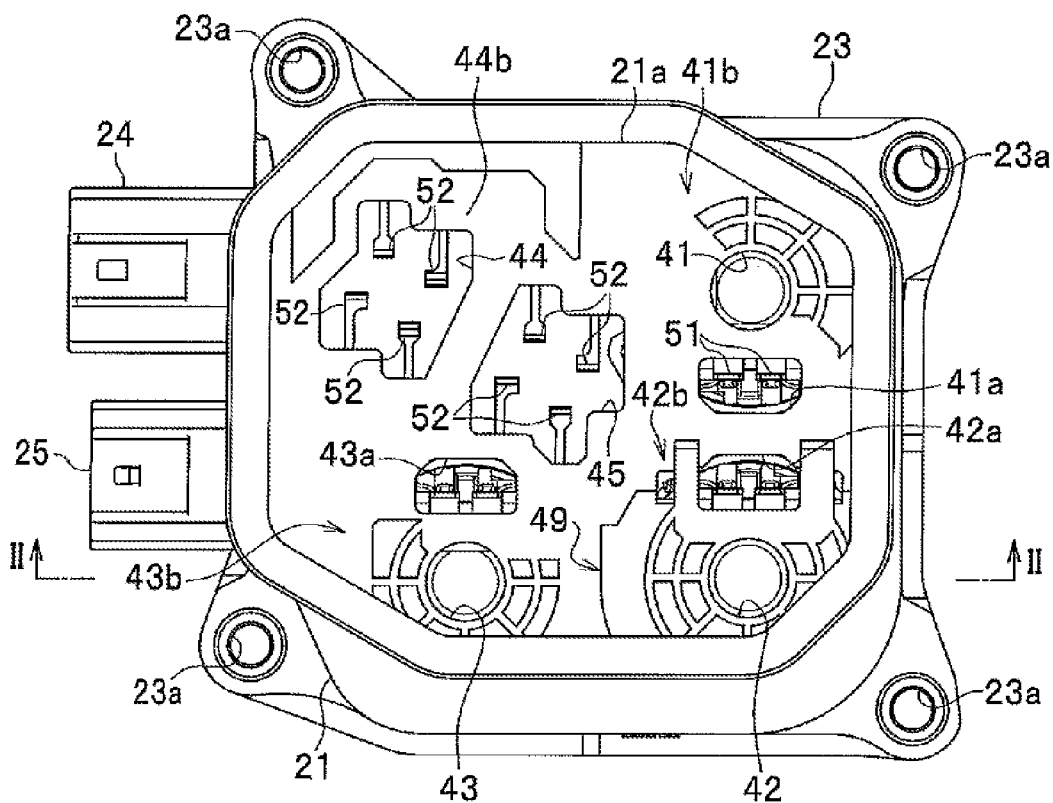
FIG. 8A is a right side view of the housing in a state that the lid body is removed.
Figure 8B:
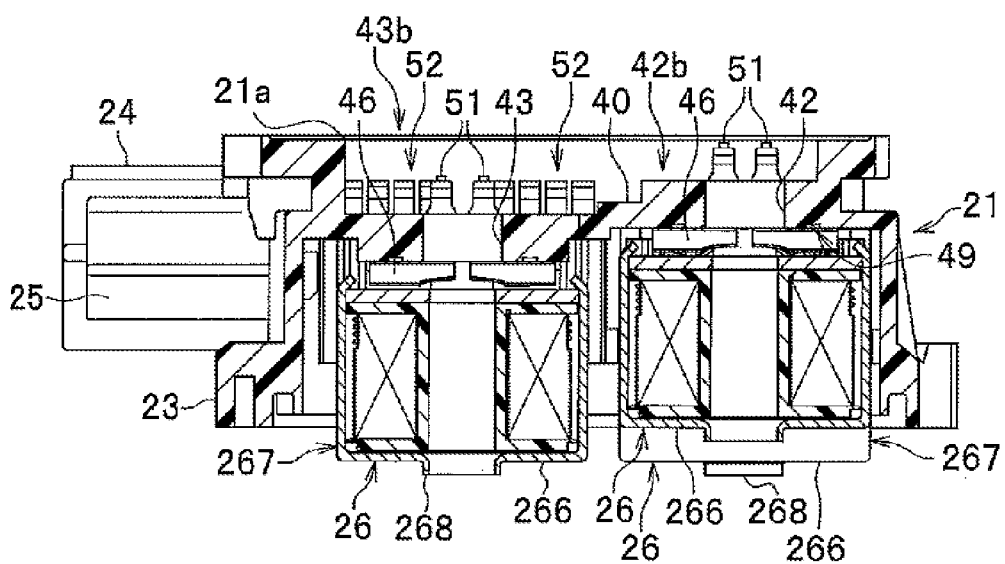
FIG. 8B is a cross-sectional view of the housing to which a coil is attached, the view being taken along line II-II in FIG. 8A.

As shown in FIG. 8A, three valve inserting holes 41, 42, 43, three coil openings 41a, 42a, 43a, and two sensor openings 44, 45 penetrate through the in-between wall portion 40 along the front/rear direction.

The first valve inserting hole 41 is a cylindrical hole where the upper end portion of the solenoid valve 4a of the normally-open shutoff valve 4 for the master cylinder 1 is inserted, and the valve inserting hole 41 is formed at the corner portion 41b on the posterior upper side of the in-between wall portion 40.

The second valve inserting hole 42 is a cylindrical hole where the upper end portion of the solenoid valve 5a of the normally-open shutoff valve 5 for the master cylinder 1 is inserted, and the second valve inserting hole 42 is formed at the corner portion 42b on the posterior lower side of the in-between wall portion 40.

The third valve inserting hole 43 is a cylindrical hole where the upper end portion of the solenoid valve 6a of the normally-closed shutoff valve 6 for the stroke simulator 2 is inserted, and the third valve inserting hole 43 is formed at the corner portion 43b on the anterior lower side of the in-between wall portion 40.

The first coil opening 41a is an opening which the connecting terminal 26a (see FIG. 3, the same in the following) of the coil 26 of the normally-open shutoff valve 4 is inserted through, and is disposed on the lower side of the valve inserting hole 41.

The second coil opening 42a is an opening which the connecting terminal 26a of the coil 26 of the normally-open shutoff valve 5 is inserted through, and is disposed on the upper side of the valve inserting hole 42.

The third coil opening 43a is an opening which the connecting terminal 26a of the coil 26 of the normally-closed shutoff valve 6 is inserted through, and is disposed on the upper side of the valve inserting hole 43.

The connecting terminals 26a of the coils 26 are electrically connected to the busbars 51 through the respective coil openings 41a, 42a, 43a.

The sensor opening 44 is open at the corner portion 44b on the upper anterior side of the in-between wall portion 40. The terminal 7a (see FIG. 3) of the pressure sensor 7 is inserted in the sensor opening 44. The terminal 7a of the pressure sensor 7 is electrically connected with the busbar 52 through the sensor opening 44.

The sensor opening 45 is open at the central portion of the in-between wall portion 40. The connecting terminal 8a (see FIG. 3) of the pressure sensor 8 is inserted in the sensor opening 45. The connecting terminal 8a is electrically connected with the busbar 52 through the sensor opening 45.

In the present embodiment, as shown in FIG. 7, elastic members 46 are arranged as urging means between the rear surface 40b of the in-between wall portion 40 and the respective coils 26. The elastic members 46 are, as shown in FIG. 9, blade springs formed substantially in a V-shape in a side view, absorb the vibration of the respective coils 26, and restrict the rotation of the respective coils 26. Incidentally, elastic members in a coil shape may be used as the urging means.

Further, the elastic members 46 urge the respective coils 26 toward the base body 10. Thus, as shown in FIG. 9, the lower surface 269 of the yoke 262 of a coil 26 enters a recessed portion 30 provided on the attaching surface 14a to contact with the bottom surface 31 of the recessed portion 30.

Further, the lower surface 269 of the yoke 262 of the coil 26 of the normally-open shutoff valve 5 contacts with the attaching surface 14a. Still further, though not shown, the lower surface 269 of the yoke 262 of the coil 26 of the normally-closed shutoff valve 6 enters a recessed portion 30 to contact with the bottom surface 31 of the recessed portion 30.

By making a coil 26 contact with the base body 10, a heat generated by the coil 26 can be transferred to the base body 10 through the lower surface 269 of the yoke 262.

Figure 10B:
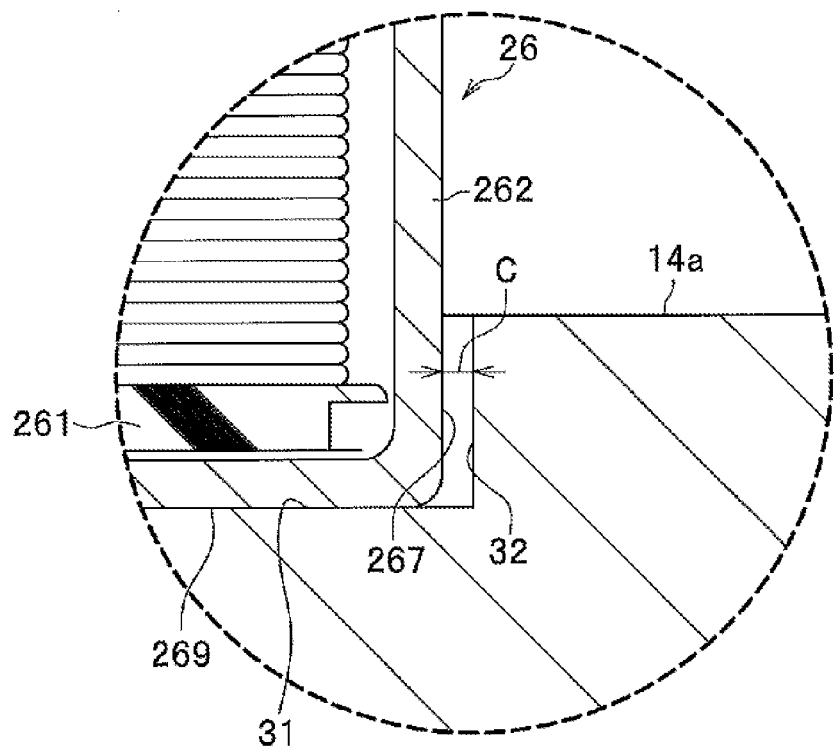
FIG. 10B is an enlarged view showing the relationship between the recessed portion and the coil.

As shown in FIG. 10B, in a state that the lower surface 269 of a yoke 262 is in contact with the bottom surface 31 of a recessed portion 30, a clearance C is formed between the lower outer circumferential surface 267 of the yoke 262 and the inner circumferential surface 32 of the recessed portion 30, the inner circumferential surface 32 acting as a wall surface. That is, the lower outer circumferential surface 267 of the yoke 262 is not in contact with the inner circumferential surface 32 of the recessed portion 30, and faces the inner circumferential surface 32 with the clearance C therebetween.

Fluid passages provided in the master cylinder device A1 will be described blow in detail. Incidentally, it is assumed in the following description that the side where the pipe connecting section 15 is arranged along the anterior/posterior direction of the master cylinder device A1 (base body 10) is referred to as the anterior face, the side where the vehicle body fixing section 12 is arranged is referred to as the posterior face, the wide where the reservoir 3 is attached is the upper face, the side opposite to the upper face is the lower face, the side where the stroke simulator 2 is disposed is the left side face, and the side where the attaching surface 14a is formed is the right side face.

Figure 12:
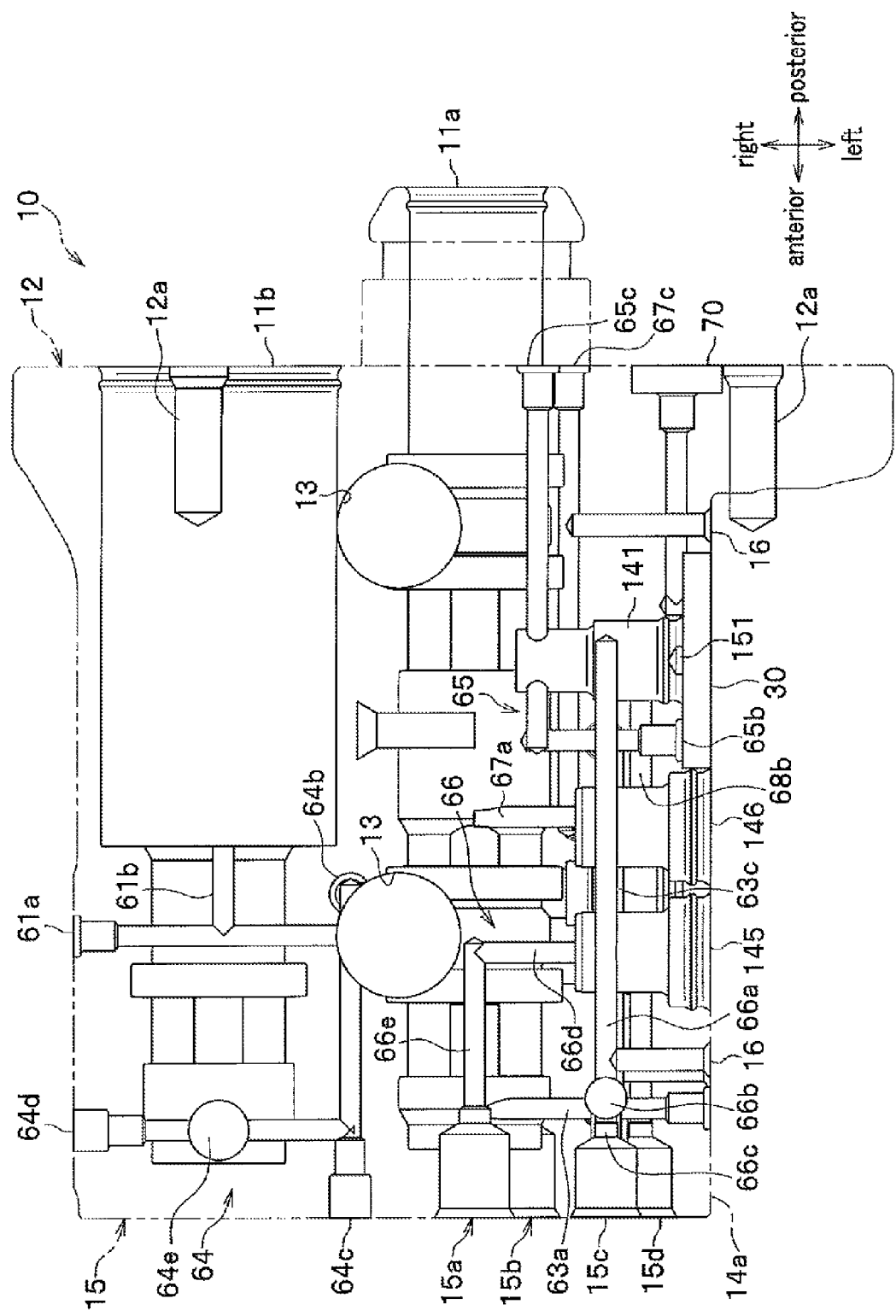
FIG. 12 is a transparent view of the flow passage section of the master cylinder device in a top view.
Figure 16:
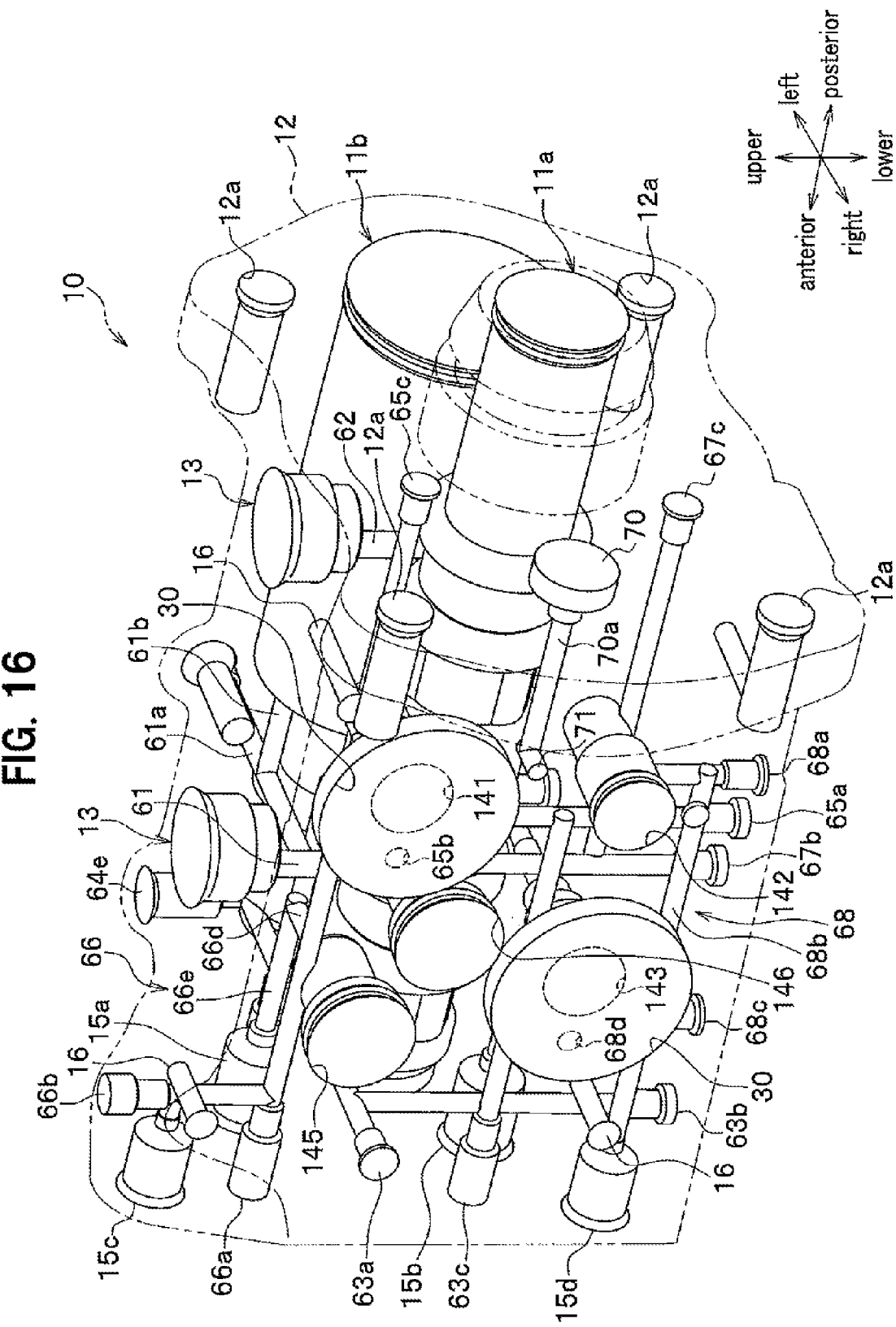
FIG. 16 is a perspective view, from the oblique posterior direction on the right side, of respective attaching holes and the inner surfaces of flow passages, which are formed in the flow passage section of the master cylinder device and are visualized.

As shown in FIG. 16, the reservoir fitting sections 13, 13 are bottomed cylindrical holes. As shown in FIG. 12, the reservoir fitting sections 13, 13 are disposed with a distance therebetween along the anterior/posterior direction (the axial direction of the master cylinder 1). As shown in FIG. 15A, the reservoir fitting section 13 on the side close to the front face communicates with the first cylinder hole 11a (the first piston 1a side, hereinafter referred to as the primary side) of the master cylinder 1 through a first fluid passage 61. Further, as shown in FIG. 15B, the reservoir fitting section 13 on the side close to the posterior face communicates with the first cylinder hole 11a (the second piston 1b side, hereinafter referred to as the secondary side) of the master cylinder 1 through a second fluid passage 62. The first fluid passage 61 and the second fluid passage 62 are vertical holes protruding from the bottom surfaces of the reservoir fitting sections 13, 13 toward the first cylinder hole 11a of the master cylinder 1.

Figure 18:
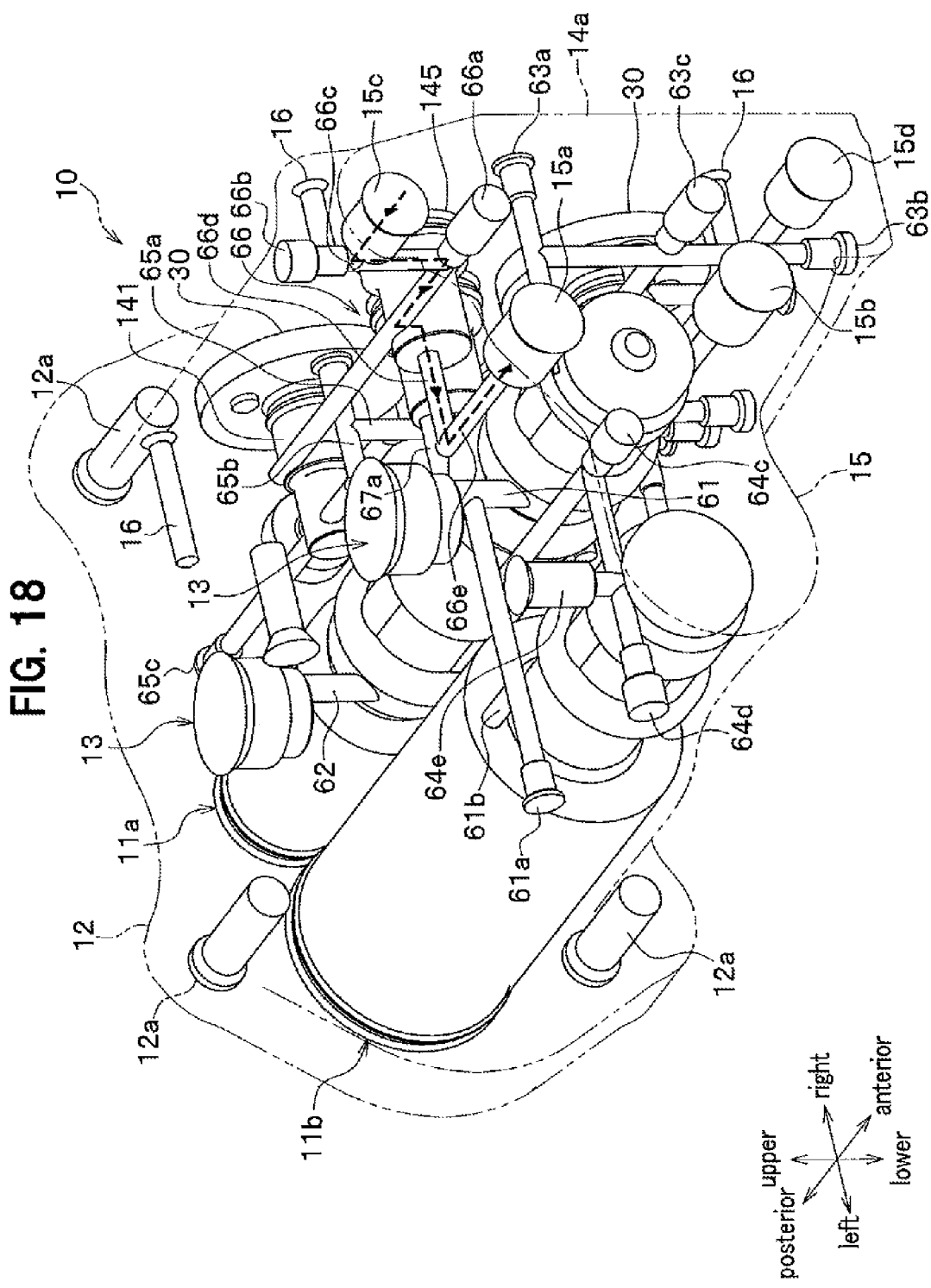
FIG. 18 is a perspective view of the same in a view from the oblique upper left on the anterior side.

As shown in FIG. 18, a horizontal hole 61a communicates with the first fluid passage 61, and a horizontal hole 61b communicates with a portion of the horizontal hole 61a such as to be perpendicular to the horizontal hole 61a. The horizontal hole 61a is disposed above the anterior part (face) of the second cylinder hole 11b. The horizontal hole 61a is protruding from the left side face of the base body 10 toward the right side face such as to be over the anterior part of the second cylinder hole 11b, and the right end thereof communicates with the first fluid passage 61. The horizontal hole 61b protrudes from the inner surface of the stepped portion 11b1 of the second cylinder hole 11b toward the anterior face, and the front end thereof communicates with the horizontal hole 61a.

Figure 17:
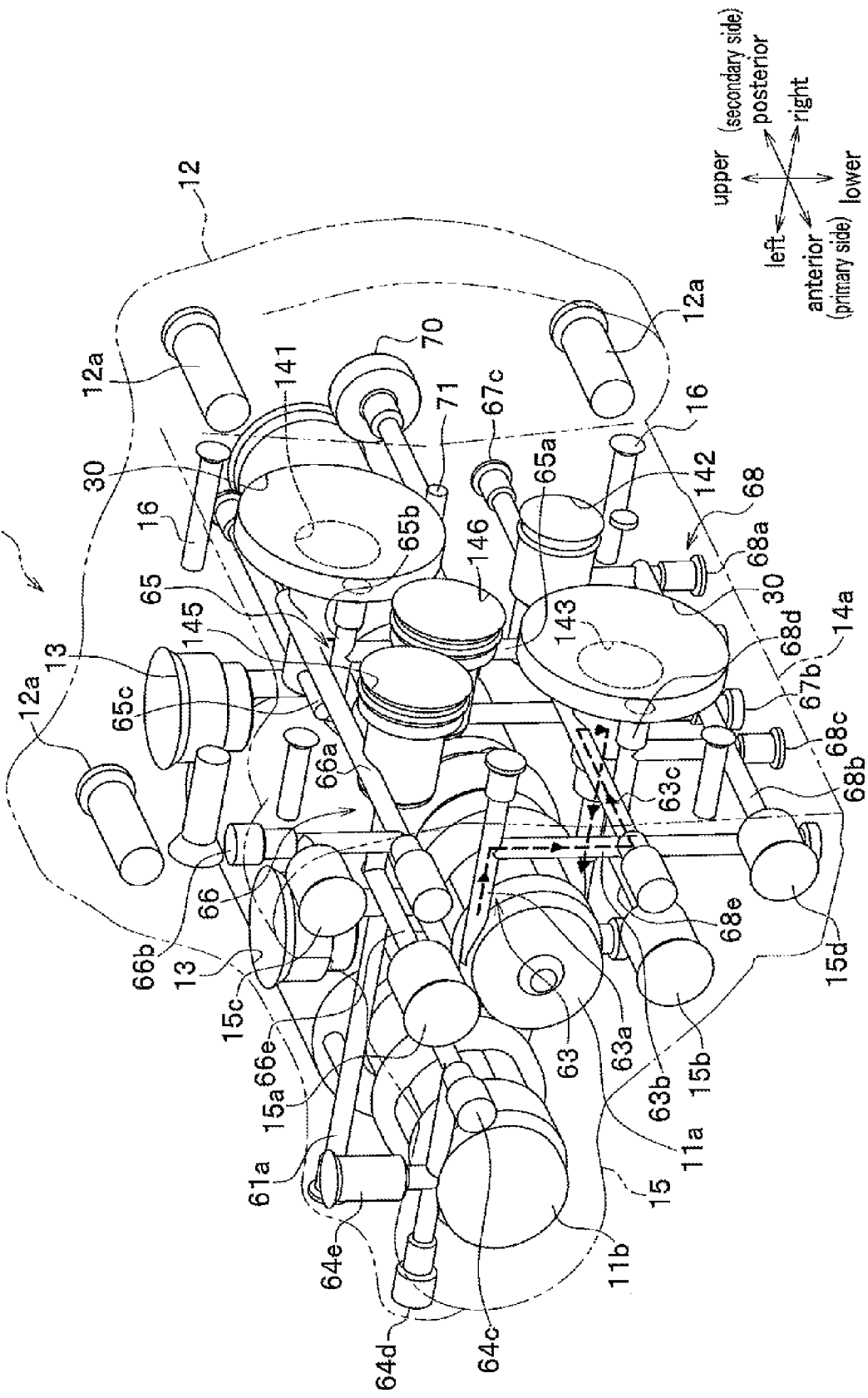
FIG. 17 is a perspective view of the same in a view from the oblique upper anterior direction on the right side.

The primary side of the first cylinder hole 11a communicates with the valve attaching hole 143 through a third fluid passage 63, as shown in FIG. 17. The third fluid passage 63 is structured by a cylinder side horizontal hole 63a, a vertical hole 63b, and a valve side horizontal hole 63c. The cylinder side horizontal hole 63a protrudes in the direction from the right side face of the base body 10 toward the left side face, and the left end thereof communicates with the primary side of the first cylinder hole 11a. The vertical hole 63b protrudes in the direction from the lower face of the base body 10 toward the upper face, and the upper end thereof communicates with the cylinder side horizontal hole 63a. The valve side horizontal hole 63c protrudes in the direction from the anterior face toward the posterior side of the base body 10, interests with the vertical hole 63b, and penetrates through the circumferential wall of the valve attaching hole 143 so that the posterior end thereof reaches the vicinity of the valve attaching hole 142, as shown in FIG. 11.

Figure 13:
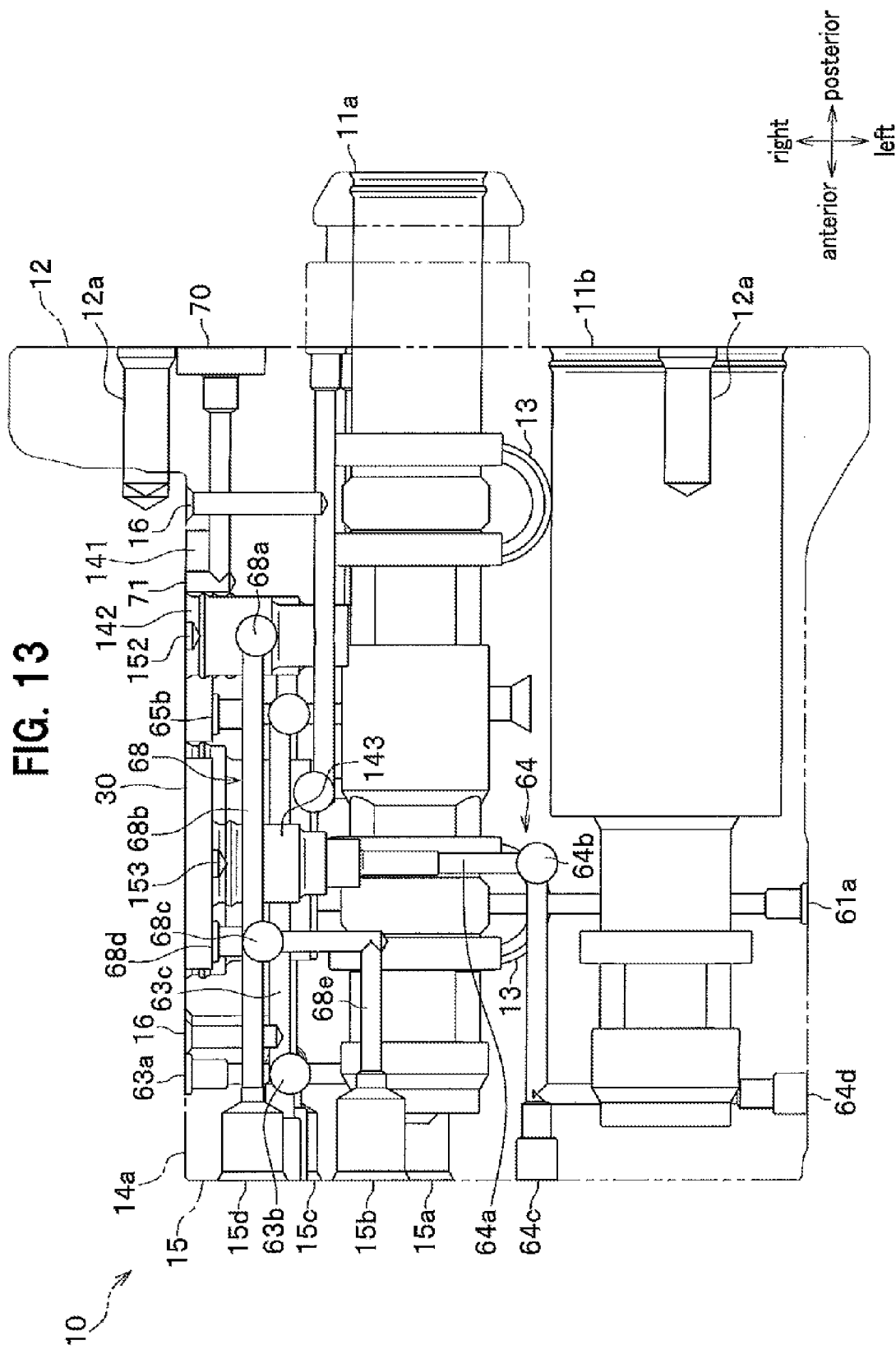
FIG. 13 is a transparent view of the flow passage section of the master cylinder device in a bottom view.
Figure 19:
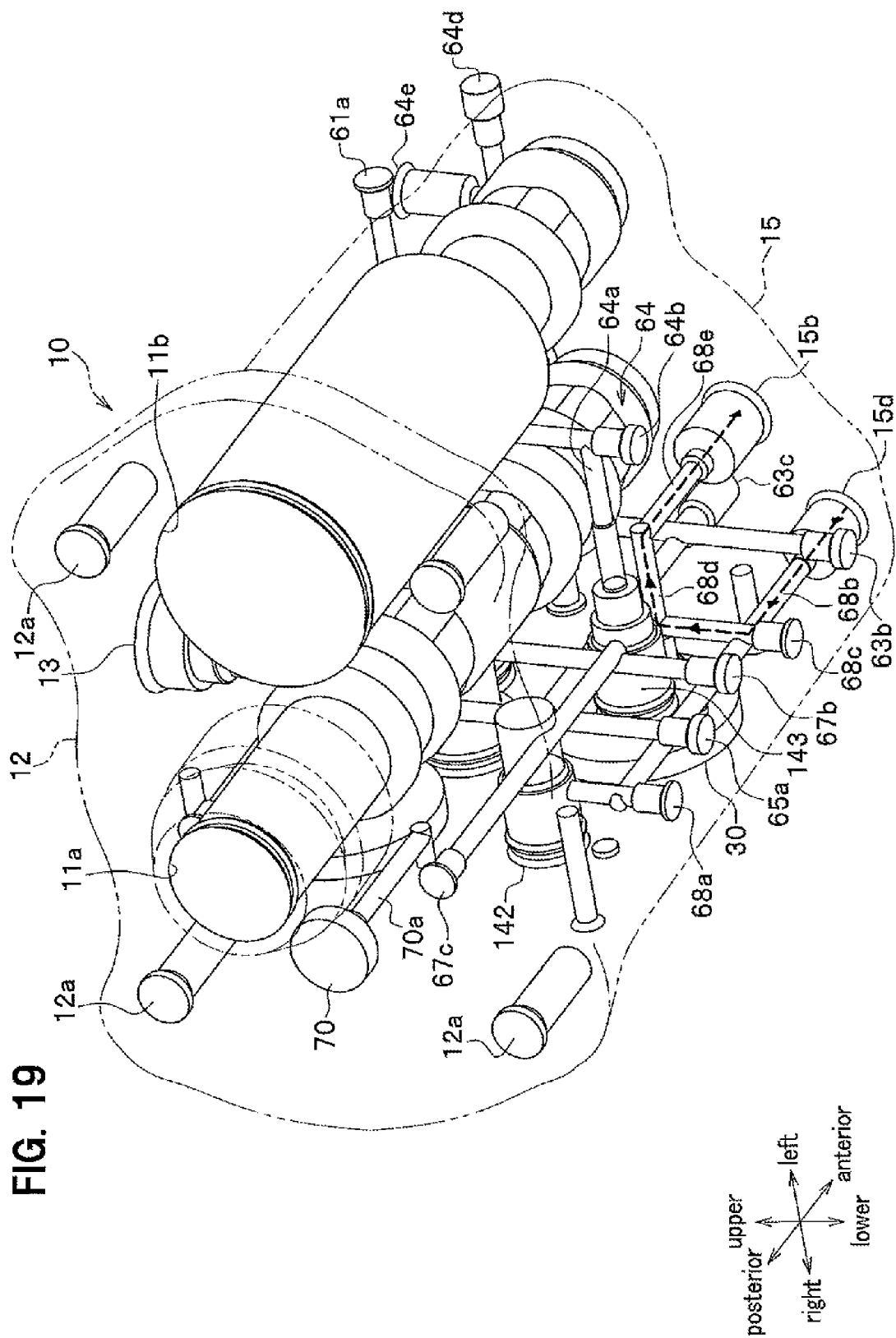
FIG. 19 is a perspective view of the same in a view from the oblique lower left on the posterior side.

The valve attaching hole 143 is a bottomed and stepped cylindrical hole, and as shown in FIG. 13, FIG. 15A, and FIG. 19, communicates with the second cylinder hole 11b of the stroke simulator 2 through a fourth fluid passage 64. The fourth fluid passage 64 includes a valve side horizontal hole 64a, a vertical hole 64b, a cylinder side first horizontal hole 64c, and a cylinder side second horizontal hole 64d. The valve side horizontal hole 64a protrudes from the bottom surface of the valve attaching hole 143 toward the left side face of the base body 10. The valve side horizontal hole 64a extends below the anterior portion of the first cylinder hole 11a to reach a region between the first cylinder hole 11a and the second cylinder hole 11b. The vertical hole 64b protrudes from the lower face toward the upper face of the base body 10 and interests with the left end of the valve side horizontal hole 64a.

As shown in FIG. 12, the cylinder side first horizontal hole 64c protrudes from the anterior face toward the posterior face of the base body 10, and the posterior end thereof communicates with the upper end of the vertical hole 64b. The cylinder side second horizontal hole 64d protrudes from the left side face toward the right side face of the base body 10, penetrates through the circumferential wall at the upper portion on the anterior side of the second cylinder hole 11*b*, and the right end thereof communicates with a portion of the cylinder side first horizontal hole 64*c*. Incidentally, the cylinder side second horizontal hole 64*d* is provided with a fluid introduction port 64*e*.

Figure 11:
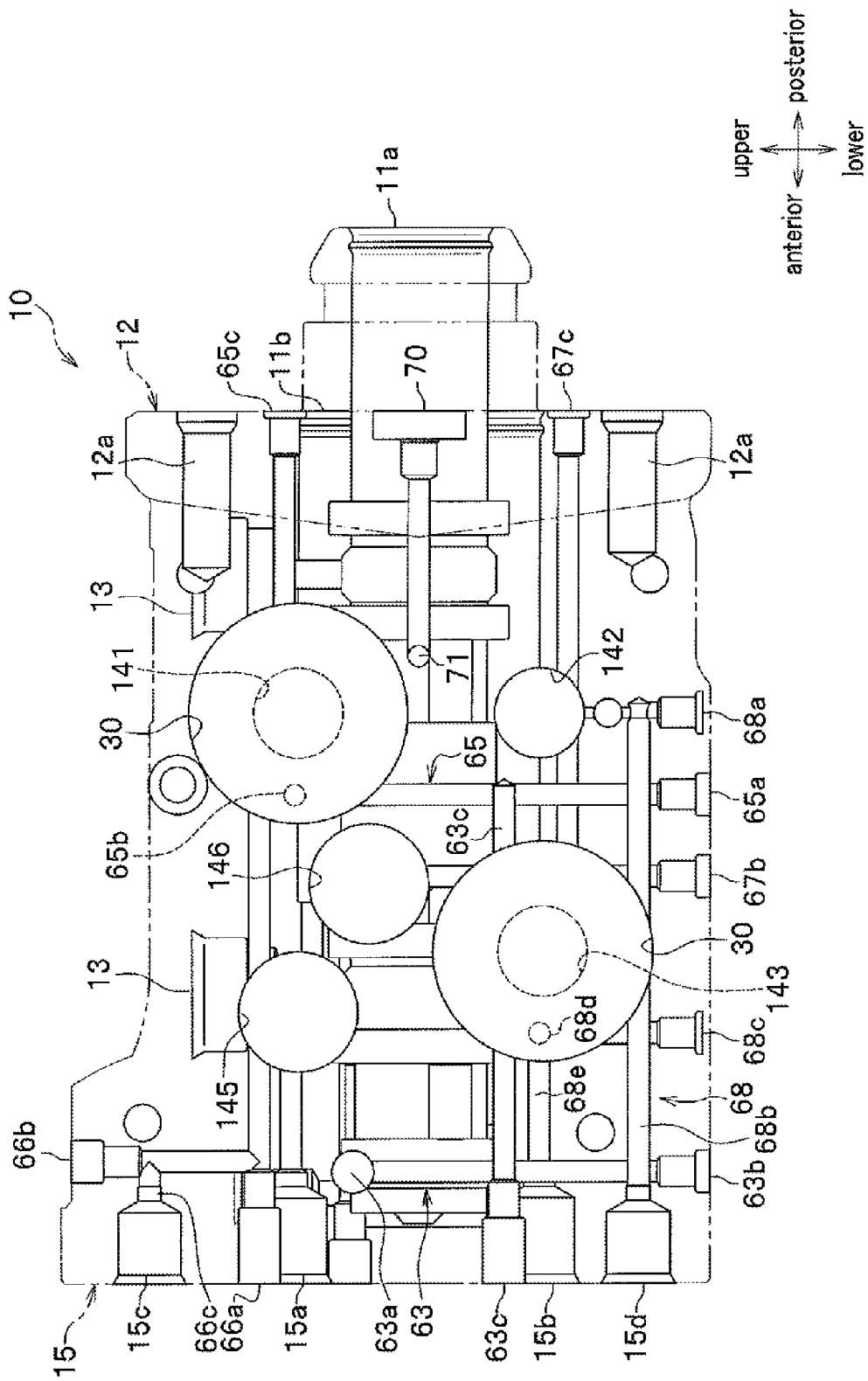
FIG. 11 is a transparent view of the flow passage section of the master cylinder device in a view from the right side.

The above-described valve side horizontal hole 63*c* of the third fluid passage 63 communicates, as shown in FIG. 11 and FIG. 17, with the valve attaching hole 141 through a fifth fluid passage 65. The fifth fluid passage 65 includes a vertical hole 65*a*, a first horizontal hole 65*b* (see FIG. 17), and a second horizontal hole 65*c* (see FIG. 17). The vertical hole 65*a* protrudes from the lower face toward the upper face of the base body 10 in a region between the valve attaching hole 141 and the valve attaching hole 143, and a portion thereof interests with the posterior end of the valve side horizontal hole 63*c* of the third fluid passage 63. The first horizontal hole 65*b* is disposed anterior to the valve attaching hole 141, protrudes from the bottom surface 31 (see FIG. 3, the same in the following) of the recessed portion 30 toward the left side face of the base body 10, and a portion thereof intersects with the upper end of the vertical hole 65*a*, as shown in FIG. 17. The second horizontal hole 65*c* is disposed above the first cylinder hole 11*a* (see FIG. 15B), protrudes from the posterior face toward the anterior face of the base body 10, penetrates along the anterior/posterior direction through the side wall of the bottom portion of the valve attaching hole 141 formed in a bottomed and stepped cylindrical shape, and reaches the posterior end of the first horizontal hole 65*b*.

As shown in FIG. 12 and FIG. 17, the valve attaching hole 141 communicates with the sensor attaching hole 145, the output port 15*a*, and the input port 15*c* through a sixth fluid passage 66. The sixth fluid passage 66 includes a first horizontal hole 66*a*, a vertical hole 66*b*, a second horizontal hole 66*c*, a third horizontal hole 66*d*, and a fourth horizontal hole 66*e*. The first horizontal hole 66*a* protrudes from the anterior face toward the posterior face of the base body 10, penetrates through the upper circumferential wall of the sensor attaching hole 145, and reaches the upper circumferential wall of the valve attaching hole 141. The intersection position between the first horizontal hole 66*a* and the valve attaching hole 141 is on the attaching surface 14*a* side of the intersection position between the second horizontal hole 65*c* of the fifth fluid passage 65 and the valve attaching hole 141. The vertical hole 66*b* protrudes from the upper face toward the lower face of the base body 10, and the lower end thereof communicates with the first horizontal hole 66*a*. As shown in FIG. 11, the second horizontal hole 66*c* protrudes from the bottom surface of the input port 15*c* in a bottomed cylindrical shape toward the posterior face of the base body 10, and the posterior end thereof communicates with the vertical hole 66*b*.

As shown in FIG. 12, the third horizontal hole 66*d* protrudes from the bottom surface of the sensor attaching hole 145 toward the left side face of the base body 10. The fourth horizontal hole 66*e* protrudes from the bottom surface of the output port 15*a* in a bottomed cylindrical shape toward the posterior face of the base body 10, and communicates with the left end of the third horizontal hole 66*d*.

That is, the output port 15*a* and the input port 15*c* communicate with each other through the sixth fluid passage 66. Incidentally, the input port 15*c* is located obliquely right above the output port 15*a*.

As shown in FIG. 15B, the secondary side of the first cylinder hole 11*a* communicates with the sensor attaching hole 146 and the valve attaching hole 142 through a seventh fluid passage 67. The seventh fluid passage 67 includes a sensor horizontal hole 67*a*, a vertical hole 67*b*, and a horizontal hole 67*c*. The sensor horizontal hole 67*a* protrudes from the bottom surface of the sensor attaching hole 146 toward the left side face of the base body 10, and the posterior end thereof communicates with the secondary side of the first cylinder hole 11*a*. On the right side (the attaching surface 14*a* side) of the first cylinder hole 11*a*, the vertical hole 67*b* protrudes from the lower face toward the upper face of the base body 10, and the upper end thereof communicates with the bottom surface of the sensor attaching hole 146. As shown in FIG. 16, the horizontal hole 67*c* protrudes from the posterior face toward the anterior face of the base body 10, penetrates along the anterior/posterior direction through the side wall of the bottom portion of the sensor attaching hole 146, and the anterior end thereof intersects with the vertical hole 67*b*.

Figure 14:
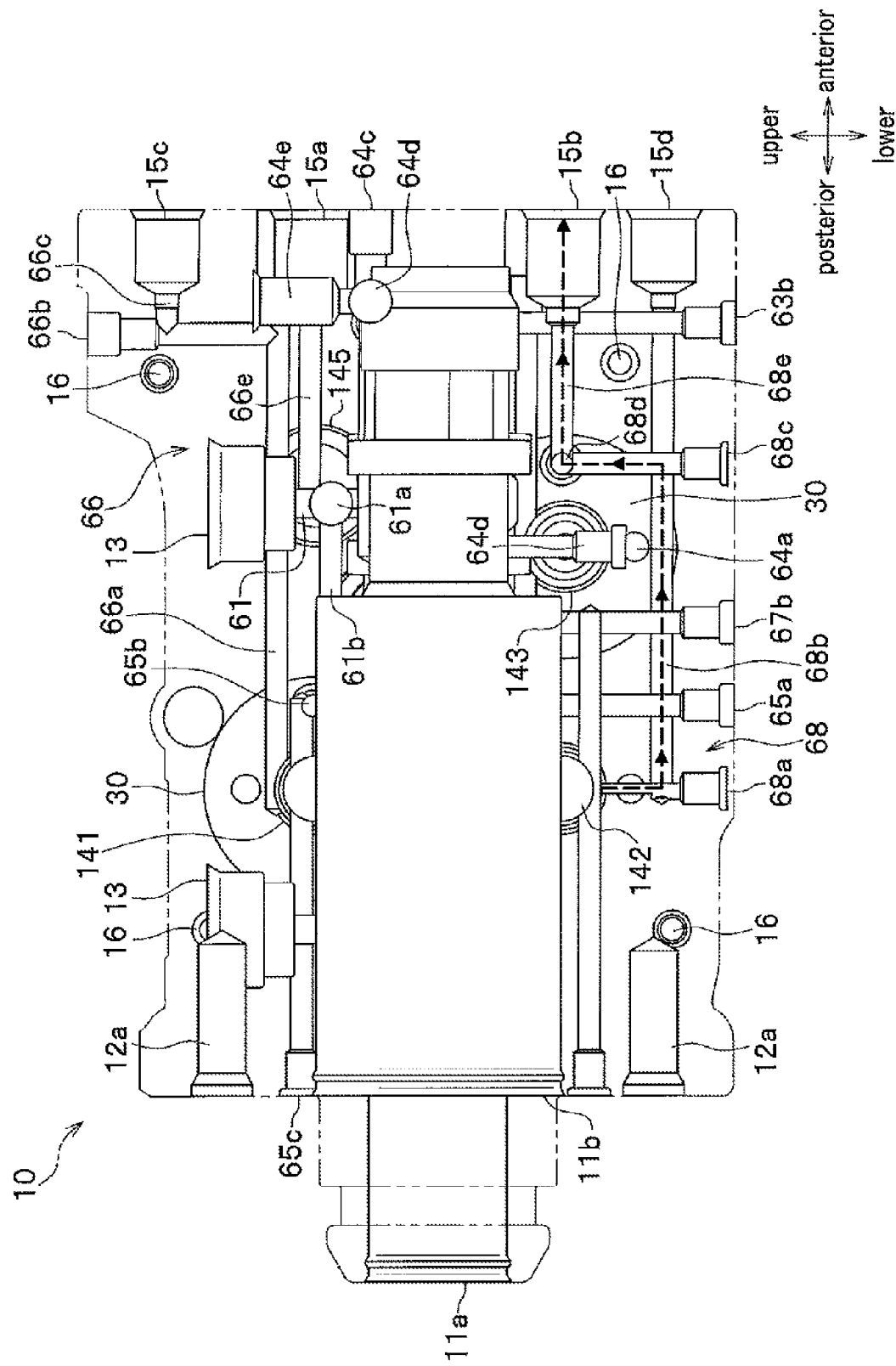
FIG. 14 is a transparent view of the flow passage section of the master cylinder device in a view from the left side.
Figure 20:
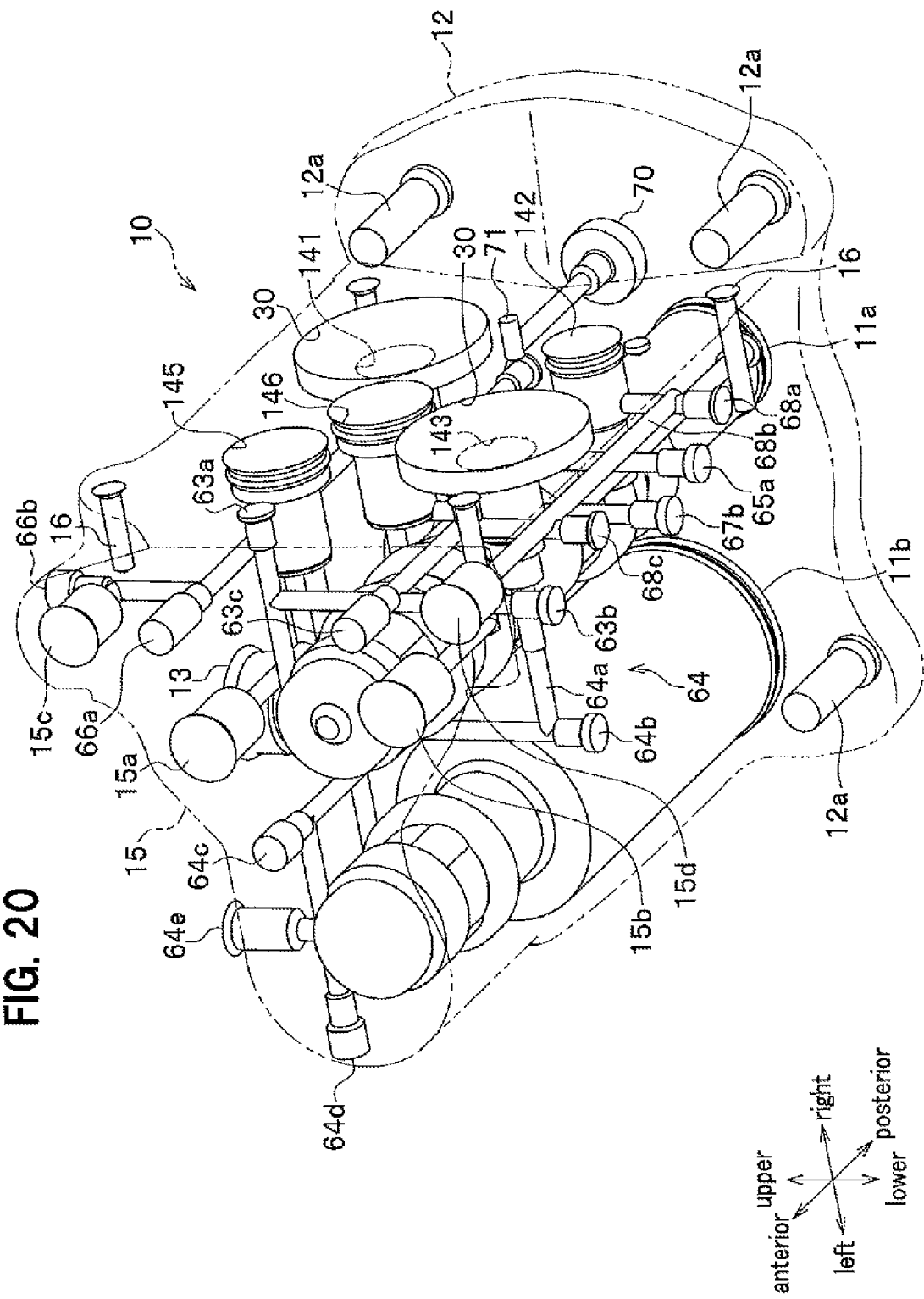
FIG. 20 is a perspective view of the same in a view from the oblique lower right on the anterior side.

The valve attaching hole 142 is a bottomed and stepped cylindrical hole, and as shown in FIG. 17, communicates with the output port 15*b* and the input port 15*d* through an eighth fluid passage 68. The eighth fluid passage 68 includes a valve side vertical hole 68*a*, a lower horizontal hole 68*b*, a port side vertical hole 68*c*, a first upper horizontal hole 68*d*, and a second upper horizontal hole 68*e*. As also shown in FIG. 14 and FIG. 20, the valve side vertical hole 68*a* protrudes from the lower face toward the upper face of the base body 10, and communicates with the lower portion of the circumferential wall of the valve attaching hole 142. The lower horizontal hole 68*b* protrudes from the bottom face toward the posterior face of the input port 15*d* in a bottomed cylindrical shape, and the posterior end thereof communicates below the valve attaching hole 143 with the valve side vertical hole 68*a*. The port side vertical hole 68*c* protrudes from the lower face toward the upper face of the base body 10, anteriorly to the valve attaching hole 143, and a portion thereof intersects with the lower horizontal hole 68*b*. The first upper horizontal hole 68*d* protrudes from the bottom surface 31 of the recessed portion 30 toward the left side face of the base body 10, anteriorly to the valve attaching hole 143. The second upper horizontal hole 68*e* protrudes from the bottom surface of the output port 15*b* in a bottomed cylindrical shape toward the posterior face of the base body 10, and the posterior end thereof communicates with the left end of the first upper horizontal hole 68*d*.

That is, the output port 15*b* and the input port 15*d* communicate with each other through the eighth fluid passage 68. Incidentally, the input port 15*d* is located obliquely right below the output port 15*b*.

Incidentally, as shown in FIG. 16, the vehicle body fixing section 12 of the base body 10 is provided with a vent 70. This vent 70 is in a bottomed cylindrical shape and has a communication hole 70*a* protruding from the bottom face thereof toward the anterior face of the base body 10. A hole portion 71 protruding from the right side face (attaching surface 14*a*) toward the left side face of the base body 10 communicates with the anterior end of the communication hole 70*a*. The vent 70 is closed by a breathable water-resistant member, not shown, that prevents water immersion and only permits air to pass through. The breathable water-resistant member can be formed, for example, of Gore-Tex (registered trademark). Thus, the outer portion of the base body 10 and the inner portion of the housing 20 tightly fixed to the attaching surface 14*a* communicate with each other through the vent 70.

Herein, the main hydraulic passage 9*a* is structured by a fluid passage that extends from the third fluid passage 63 to the fifth fluid passage 65, extends from the first horizontal hole 66a of the sixth fluid passage 66 through the valve attaching hole 141 to the sensor attaching hole 145, and further extends through the third horizontal hole 66d and the fourth horizontal hole 66e to the output port 15a.

The main hydraulic passage 9b is structured by a fluid passage that extends from the seventh fluid passage 67 (sensor attaching hole 146) through the valve attaching hole 142 and the eighth fluid passage 68 to the output port 15b.

The communicating hydraulic passage 9c is structured by the sixth fluid passage 66 (the second horizontal hole 66c, the vertical hole 66b, and the first horizontal hole 66a) connected by the input port 15c.

The communicating hydraulic passage 9d is structured by the eighth fluid passage 68 (the lower horizontal hole 68b) connected to the input port 15d.

The branch hydraulic passage 9e is structured by a fluid passage that extends from the valve attaching hole 143 through the fourth fluid passage 64 to the second cylinder hole 11b of the stroke simulator 2.

The flow of brake fluid in the master cylinder device A1 (base body 10) will be described below.

During when the vehicle braking system A (see FIG. 1) is normally functioning, in other words, in a state that the normally-open shutoff valves 4, 5 are closed and the normally-closed shutoff valve 6 is open, when the brake pedal P (see FIG. 1) is operated, a hydraulic brake pressure generated by the master cylinder 1 flows, as shown by arrow in FIG. 17, from the third fluid passage 63 through the valve attaching hole 143 to the fourth fluid passage 64, and thereafter, as shown by arrow in FIG. 15A, flows through the fourth fluid passage 64 into the second cylinder hole 11b of the stroke simulator 2.

Incidentally, a change in the inner volume due to operation of the stroke simulator 2 pushes out brake fluid from the second cylinder hole 11b, and this pushed out brake fluid flows through the horizontal hole 61b and the horizontal hole 61a into the first fluid passage 61 to be returned to the master cylinder 1 (reservoir 3) (see FIG. 18).

Thus, the hydraulic brake pressure generated by the master cylinder 1 is transmitted not to the wheel cylinders W but to the stroke simulator 2 so that the piston 2a is displaced, ant a stroke of the brake pedal P is thereby permitted and a pseudo operation reaction force is applied to the brake pedal P.

Further. when brake a pedal effort on the brake pedal P is detected by a stroke sensor or the like, not shown, the electric motor of the motor cylinder device A2 is driven so that the slave piston is displaced, thereby a pressure being applied to the brake fluid in the cylinder.

The pressurized brake fluid is input through the pipe member Hc (see FIG. 1) to the input port 15c, and, as shown by arrow in FIG. 18, flows from the input port 15c through the sixth fluid passage 66 (sensor attaching hole 145) to the output port 15a.

Then, the pressurized brake fluid flows from the output port 15a through the hydraulic control device A3 to the wheel cylinders W, W. Thus, the respective wheel cylinders W operate, and thereby a braking force is applied to the respective wheels.

Further, the brake fluid pressurized by the motor cylinder device A2 is input through the pipe member Hd (see FIG. 1) to the input port 15d, and as shown by arrow in FIG. 19, flows from the input port 15d through the eighth fluid passage 68 to the output port 15b.

On the other hand, in a state that the motor cylinder device A2 does not operate (for example, in a case of unavailability of electric power, emergency, or the like), both the normally-open shutoff valves 4, 5 become into a valve open state and the normally-closed shutoff valve 6 becomes into a valve closed state. Consequently, a hydraulic brake pressure generated by the master cylinder 1 is directly transmitted to the wheel cylinders W, W, through the main hydraulic passages 9a, 9b.

That is, on the primary side of the master cylinder 1, a hydraulic brake pressure generated by the master cylinder 1 flows to the third fluid passage 63, the fifth fluid passage 65, the valve attaching hole 141, and the sixth fluid passage 66 (sensor attaching hole 145), which form the main hydraulic passage 9a, and is output through the output port 15a.

Further, on the secondary side of the master cylinder 1, the hydraulic brake pressure generated by the master cylinder 1 flows, as shown by arrow in FIG. 15B, from the seventh fluid passage 67 (sensor attaching hole 146) forming the main hydraulic passage 9b to the valve attaching hole 142, and is output thereafter through the eighth fluid passage 68 and the output port 15b, as shown by arrow in FIG. 14.

According to the above-described present embodiment, the two normally-open shutoff valves 4, 5 opening and closing flow passages are disposed, sandwiching the central axis O of the master cylinder 1 therebetween in a view from the direction perpendicular to the one surface of the base body 10. Accordingly, it is possible to form fluid passages with a short length, the fluid passages connecting the master cylinder 1 and the two normally-open shutoff valves 4, 5. Thus, the structure of the fluid passages can be made simple, and downsizing of the base body 10 (master cylinder device A1) can be achieved.

As the normally-open shutoff valves 5, 6 for opening and closing the two main hydraulic passages 9a, 9b connected to the master cylinder 1 are disposed, sandwiching the central axis O of the master cylinder 1 therebetween, it is possible to form the two main hydraulic passages 9a, 9b connects to the master cylinder 1 with a short length even if the master cylinder 1 is a tandem type. Thus, the structure of the fluid passages can be made simple, and downsizing of the base body 10 (master cylinder device A1) can be achieved.

Further, as recessed portions 30, 30 are provided on the valve attaching holes 141, 143, the attaching positions of the normally-open shutoff valve 4 and the normally-closed shutoff valve 6 can be changed by the depth of the recessed portions 30, 30. Thus, the positions of forming the fluid passages connected to the normally-open shutoff valve 4 and the normally-closed shutoff valve 6 can be changed, and the degree of freedom of forming the fluid passages is thereby increased. In such a manner, the structure of a fluid passage can also be simplified, enabling downsizing of the base body 10 (master cylinder device A1).

Recessed portions 30, 30 are arranged for the normally-open shutoff valve 4 and the normally-closed shutoff valve 6 provided on the fluid passage (the main fluid passage 9a) of the same system, and are not arranged for the fluid passage (the main hydraulic passage 9b) of the other system. Thus, the position of forming a fluid passage can be made different, depending on the system so that the degree of freedom of forming a fluid passage is increased. In such a manner, the stricture of a fluid passage can be simplified, and downsizing of the base body 10 (master cylinder device A1) can be achieved.

Incidentally, arrangement may be made such that a recessed portion 30 is arranged only for the normally-open shutoff valve 5 on the fluid passage (the main fluid passage 9b) of the other system, and a position of forming the fluid passage may be arranged differently from the position of the main hydraulic passage 9a.

Figure 21A:
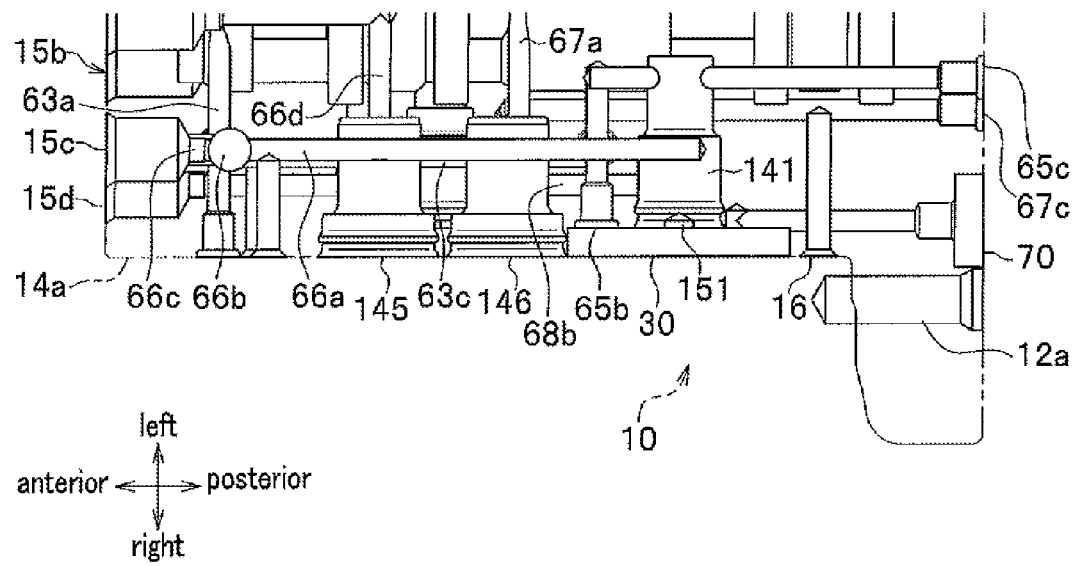
FIGS. 21A and 21B are illustrations of action by the recessed portion.

For example, in the present embodiment, as shown in FIG. 21A, as the valve attaching hole 141 is offset to the inner side of the base body 10 by the recessed portion 30, the positions of forming the fluid passages for the valve attaching hole 141 and the sensor attaching hole 145 agree with each other with respect to the anterior/posterior direction of the base body 10, and these can be connected by a single first horizontal hole 66a. Incidentally, the positions of forming the fluid passages for the valve attaching hole 141 and the sensor attaching hole 145 are naturally limited by the structures of the pressure sensor 7 and the normally-open shutoff valve 4.

Figure 21B:
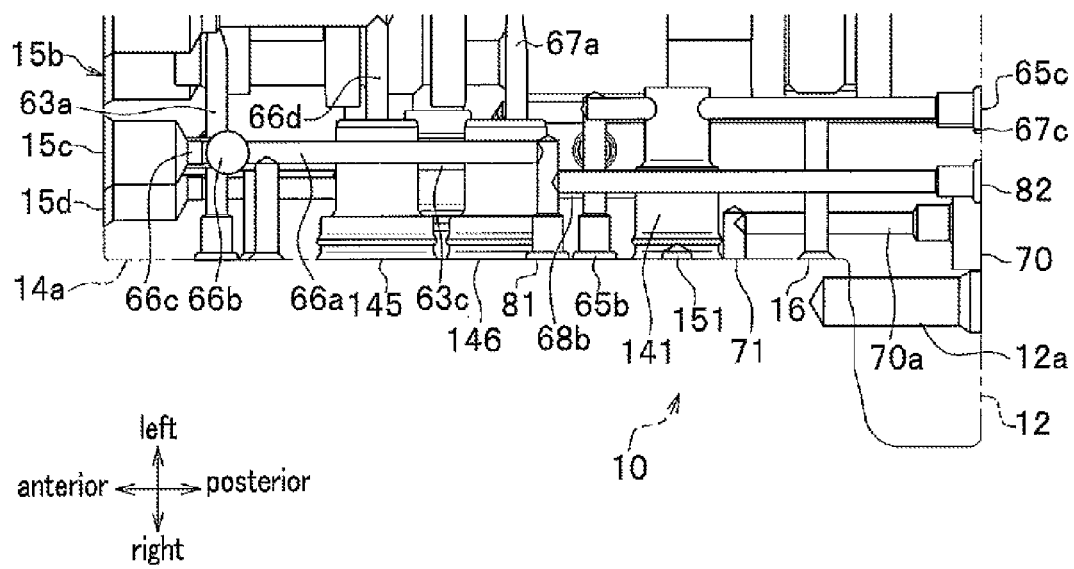

Herein, as shown in FIG. 21B, if the valve attaching hole 141 were not provided with the recessed portion 30, when a valve and a sensor with different sizes with respect to the left/right direction of the base body 10 are disposed at the valve attaching hole 141 and the sensor attaching hole 145, a gap would occur between the positions of forming the fluid passages, and it would be necessary to additionally form two horizontal holes 81, 82 on the base body 10 to make these communicate with each other. Thus, work for processing the horizontal holes 81, 82 is necessary and the number of fluid passages increases, resulting in a decrease in the degree of freedom of the layout of fluid passages.

In contrast, in the present embodiment, as it is possible to connect the valve attaching hole 141 and the sensor attaching hole 145 by the single first horizontal hole 66a, it is only necessary to process minimum necessary fluid passages, and it is thus possible to obtain an advantage of improving the degree of freedom of the layout of fluid passages.

Further, according to the present embodiment, as it is possible to easily provide the inner circumferential surfaces 32 (wall surfaces) facing the lower outer circumferential surfaces 267 of coils 26 by forming recessed portions 30, 30, an excellent productivity is attained.

Further, in a view from a direction perpendicular to the one surface of the base body 10, the normally-open shutoff valve 5 and the normally-closed shutoff valve 6 are disposed on one side (lower side), and the normally-open shutoff valve 4 and the pressure sensor 7 are disposed on the other side (upper side), with the central axis O of the master cylinder 1 therebetween, and these are disposed such as to form the corners of a quadrilateral. Accordingly, compared with a case, for example, that these are arrayed for example on a line, the fluid passages can be made short and disposed closely, and as a result, it is possible to realize downsizing of the base body 10 (master cylinder device A1).

Further, in a structure including the stroke simulator 2 and the normally-closed shutoff valve 6 for opening and closing the fluid passage to the stroke simulator 2, the structure of the fluid passage can be simplified to enable downsizing of the base body 10 (master cylinder device A1).

Still further, as the inner circumferential surfaces 32 of recessed portions 30 face the lower outer circumferential surfaces 267 of the respective coils 26, it is possible to transfer the heat of the coils 26, whose temperature has become a high temperature, to the base body 10 from the respective lower outer circumferential surfaces 267 through the inner circumferential surfaces 32. Thus, the heat of the coils 26 can be absorbed by the base body 10 and radiated through the base body 10.

Yet further, as the lower surfaces 269 of coils 26 are in contact with the bottom surfaces 31 of respective recessed portions 30, the heat of the coils 26, whose temperature has become a high temperature, can be directly transferred to the base body 10 through the lower surfaces 269 of the respective coils 26. Thus, the heat of the coils 26 can be further absorbed by the base body 10, and heat radiation can be effectively carried out through the base body 10.

Further, the elastic members 46 for urging coils 26 toward the attaching surface 14a of the base body 10 are arranged between the in-between wall portion 40 of the housing 20 and the coils 26. Accordingly, the lower surfaces 269 of the coils 26 are ensured to contact with the attaching surface 14a, and heat can be surely transferred through the lower surfaces 269 to the base body 10. Thus, heat radiation can be effectively carried out through the base body 10.

Still further, clearances C are formed between the lower outer circumferential surfaces 267 of coils 26 and the inner circumferential surfaces 32 of recessed portions 30, even when a little deviation of the attaching position of the coils 26 housed in the housing 20 exists in attaching the housing 20 to the attaching surface 14a, it can be appropriately absorbed by the clearances C, and excellent assembly can be achieved.

Heat radiation gel having a heat radiation effect may be disposed to bury the clearances C. Further, also by arranging recessed portions 30, 30 such as to eliminate the clearances C, heat radiation effect can be obtained, and positioning is possible in holding or attaching coils 26.

In the foregoing embodiment, although recessed portions 30, 30 are provided at the valve attaching holes 141, 143, arrangement may be made such as to provide a recessed portion 30 at at least one of the valve attaching holes 141-143.

Further, as the communicating hydraulic passages (fluid passages) 9c, 9d are disposed anterior to the normally-open shutoff valves 4, 5, the normally-closed shutoff valve 6, and the pressure sensors 7, 8, the communicating hydraulic passages 9c, 9d do not interfere with the normally-open shutoff valves 4, 5, the normally-closed shutoff valve 6, or the pressure sensors 7, 8, and optimization of fluid passages and downsizing of the device can be achieved.

Still further, the fluid passage to the stroke simulator 2 is disposed with a shift to the left side from the central portion with respect to the width direction of the master cylinder 1 in a view form the anterior of the base body 10, and the other fluid passage is disposed with a shift to the right side in a view from the anterior. Thus, optimization of fluid passages and downsizing of the device can be achieved.

Figure 22:
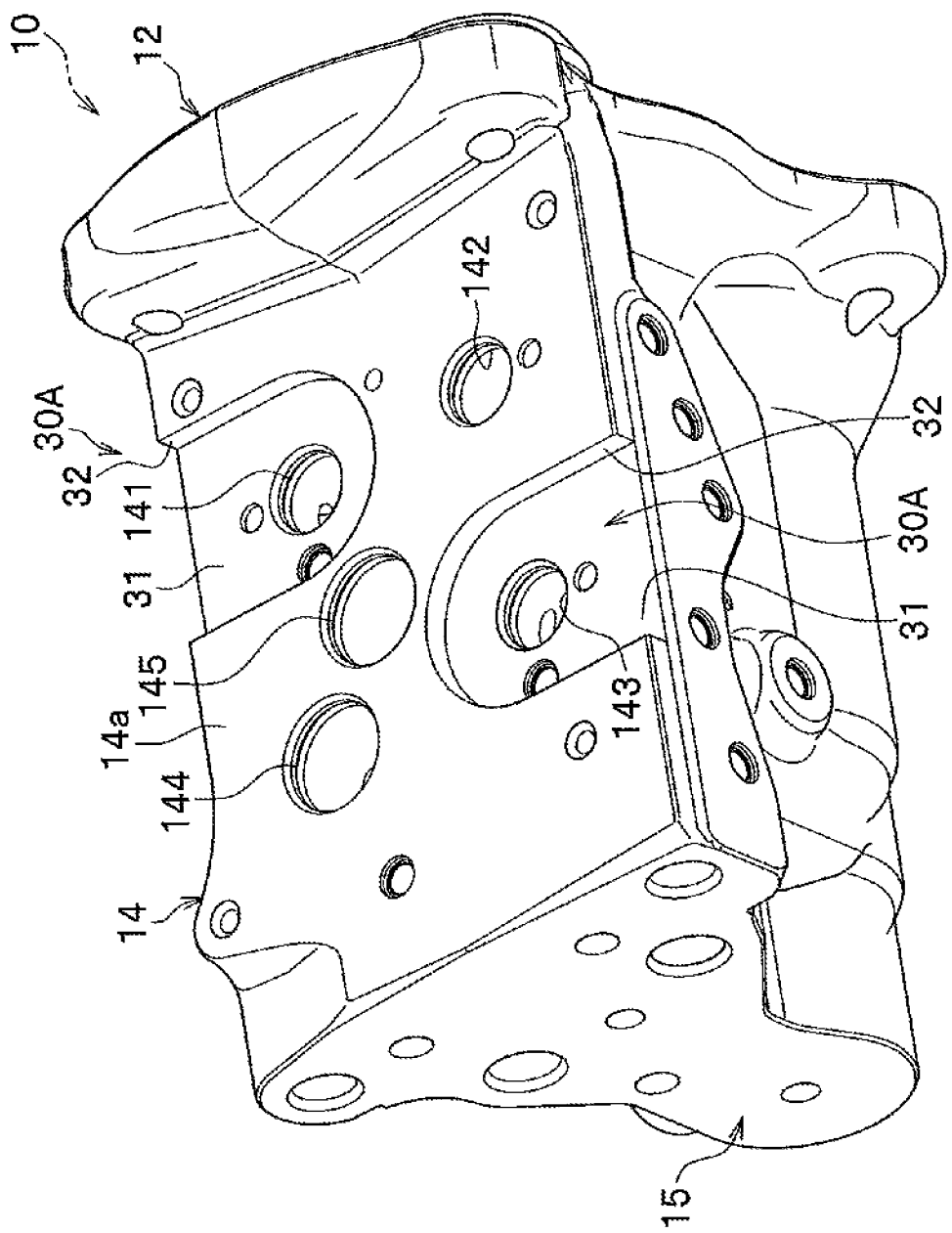
FIG. 22 is a perspective view showing the base body of a modified example.

Yet further, as shown in FIG. 22, recessed portions 30A, 30A may be provided around the valve attaching holes 141, 143 such as to be continuous from the upper end or the lower end of the attaching surface 14a. By arranging such recessed portions 30A, 30A, thinning of the attaching surface 14a can be achieved, and the cost can be thereby reduced.

Further, in the foregoing embodiment, by providing recessed portions 30, 30A, the inner circumferential surfaces 32 (wall surfaces) facing the lower outer circumferential surfaces 267 of coils 26 are formed, however, without being limited thereto, wall surfaces in a limb shape protruding from the attaching surface 14a may be provided such as to face the lower outer circumferential surfaces 267 of the coils 26. Also by such arrangement, the heat of coils 26 can be appropriately transferred through the wall surfaces in a limb shape to the base body 10.

In the forgoing embodiment, a structure of the master cylinder device A1 provided with the inner circumferential surfaces 32 facing the lower outer circumferential surfaces 267 of coils 26 has been described, however, without being limited thereto, the structure can also be appropriately applied to the hydraulic control device A3 as a hydraulic brake pressure device.

Still further, the positions of disposing the normally-open shutoff valves 4, 5, the normally-closed shutoff valve 6, the pressure sensors 7, 8, the master cylinder 1, and the stroke simulator 2 can be changed, as appropriate, depending on the relationship with the main fluid passages 9a, 9b, the position of arranging the stroke simulator 2, or the like.

DESCRIPTION OF REFERENCE SYMBOLS

1: master cylinder
2: stroke simulator
4, 5: normally-open shutoff valve (solenoid valve)
6: normally-closed shutoff valve (solenoid valve)
7, 8: pressure sensor
9a, 9b: main hydraulic passage
10: base body
20: housing
26: coil (driving coil)
30, 30A: recessed portion
31: bottom surface
32: inner circumferential surface
41-43: valve inserting hole
46: elastic member (urging means)
267: lower outer circumferential surface (outer circumferential surface)
A1: master cylinder device
C: clearance
O: central axis
P: brake pedal (brake operator)

The invention claimed is:

1. A hydraulic braking device having a base body that includes therein a fluid passage for brake fluid, comprising:
  a solenoid valve disposed on one surface of the base body; and
  a driving coil attached around an axis of the solenoid valve,
  wherein the one surface of the base body is provided with a wall surface facing an outer circumferential surface of the driving coil, and the wall surface is formed by a circumferential wall, and
  wherein an in-between wall is disposed inside a circumferential wall portion to partition a space inside the circumferential wall into a front side and a rear side.

2. The hydraulic braking device according to claim 1, wherein a lower surface of the driving coil is in contact with the one surface of the base body.

3. The hydraulic braking device according to claim 2, comprising:
  a housing for housing the driving coil,
  wherein an urging means for urging the driving coil toward the one surface of the base body is provided between the housing and the driving coil.

4. The hydraulic braking device according to claim 1, wherein a clearance is formed between the outer circumferential surface of the driving coil and the wall surface.

5. The hydraulic braking device according to claim 1, wherein a recessed portion is provided on the one surface of the base body, the recessed portion being arranged around an attaching hole to which the solenoid valve is attached,
  and wherein the wall surface is formed by the circumferential wall forming the recessed portion.

6. The hydraulic braking device according to claim 1, wherein the in-between wall has a front side and a rear side, and is formed in a quadrilateral shape, and a corner portion on a lower rear side of the in-between wall is offset to the front side, to thereby form a recessed portion on a rear face side of the in-between wall.

7. The hydraulic braking device according to claim 6, wherein the coil is housed in the recessed portion of the in-between wall.

8. The hydraulic braking device according to claim 7, wherein a rotation preventing recessed portion is formed to open at a bottom surface of the recessed portion,
  wherein the rotation preventing recessed portion is arranged corresponding to a positioning protrusion of the coil, and
  wherein the positioning protrusion is engaged with the rotation preventing recessed portion.

* * * * *